United States Patent
Weinfield

(10) Patent No.: US 10,805,261 B2
(45) Date of Patent: *Oct. 13, 2020

(54) APPARATUS FOR DETECTING DUPLICATE TEMPORARY ID

(71) Applicant: DENSO International America, Inc., Southfield, MI (US)

(72) Inventor: Aaron D. Weinfield, Encinitas, CA (US)

(73) Assignee: DENSO International America, Inc., Southfield, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/217,225

(22) Filed: Dec. 12, 2018

(65) Prior Publication Data

US 2019/0116152 A1 Apr. 18, 2019

Related U.S. Application Data

(63) Continuation of application No. 15/410,035, filed on Jan. 19, 2017, now Pat. No. 10,193,854.

(51) Int. Cl.
*H04L 29/12* (2006.01)
*H04W 4/02* (2018.01)
(Continued)

(52) U.S. Cl.
CPC ...... *H04L 61/2046* (2013.01); *H04L 43/0823* (2013.01); *H04L 61/2092* (2013.01);
(Continued)

(58) Field of Classification Search
CPC . H04L 61/2046; H04L 43/0823; H04L 63/06; H04W 4/008; H04W 4/023;
(Continued)

(56) References Cited

U.S. PATENT DOCUMENTS

| 8,878,927 B2 | 11/2014 | Richardson et al. |
| 2013/0039219 A1* | 2/2013 | Lee ................... H05B 37/0245 370/255 |

(Continued)

FOREIGN PATENT DOCUMENTS

| JP | 2005-050187 A | 2/2005 |
| WO | 2016-209314 A1 | 12/2016 |

*Primary Examiner* — Jianxun Yang

(57) ABSTRACT

The present disclosure provides an apparatus mounted on a host vehicle to detect a duplicate temporary ID in basic safety messages (BSMs). The apparatus includes a receiver and a duplicate identifier. The receiver is configured to receive the BSMs from surrounding vehicles through packet transmission. The duplication identifier configured to identify the duplicate temporary ID based on the BSMs having an identical temporary ID value commonly used by at least two surrounding vehicles. A locator is configured to detect a location for each of the packets based on locational information. An absolute distance calculator is configured to calculate an absolute distance between the locations for two successive packets. The duplication identifier is configured to identify the duplicate temporary ID when the absolute distance calculated by the absolute distance calculator is greater than an absolute distance threshold.

6 Claims, 15 Drawing Sheets

(51) Int. Cl.
*H04W 4/80* (2018.01)
*H04L 12/26* (2006.01)
*H04W 8/24* (2009.01)
*H04W 4/40* (2018.01)

(52) U.S. Cl.
CPC ............ *H04W 4/023* (2013.01); *H04W 4/80* (2018.02); *H04W 4/40* (2018.02); *H04W 8/24* (2013.01)

(58) Field of Classification Search
CPC ...... H04W 8/24; H04W 12/02; G08G 1/0141; G08G 1/096791; G08G 1/0112; G08G 1/163; G06F 21/35; G06F 21/6245; H05B 37/0245; H04B 3/542; H04B 2203/5408
See application file for complete search history.

(56) References Cited

U.S. PATENT DOCUMENTS

2015/0254977 A1* 9/2015 Grabow ............... G08G 1/0141
340/903
2017/0019257 A1* 1/2017 Shibutani ................ G06F 21/35

* cited by examiner

APPARATUS FOR DETECTING DUPLICATE TEMPORARY ID

CROSS-REFERENCE TO RELATED APPLICATION

The application claims the benefit of U.S. application Ser. No. 15/410,035, filed on Jan. 19, 2017. The entire disclosures of the above application are incorporated herein by reference.

TECHNICAL FIELD

The present disclosure relates to an apparatus for detecting a duplicate temporary ID.

BACKGROUND

V2X technology relies on a host vehicle (HV) receiving messages over a dedicated short range communications (DSRC) radio from one or more surrounding vehicles. The primary message used for vehicle-to-vehicle (V2V) communication is the Basic Safety Message (BSM), with the definition of the message defined in SAE J2735 and the rules for its usage defined in SAE J2945/1. The BSM contains a field named the DE_TemporaryID which must be initialized to a random value by each DSRC system transmitting a BSM. The value of the DE_TemporaryID is changed occasionally when the system changes its security certificates, but is not allowed to be changed at any time.

When a host vehicle receives a BSM, the DSRC system uses the DE_TemporaryID to differentiate the surrounding vehicle transmitting the BSM from other surrounding vehicles transmitting BSMs having the different DE_TemporaryID. It is important to maintain previous state information on each surrounding vehicle for various reasons, including:

maintaining accurate Packet Error Rate (PER) calculations on a per vehicle basis, as defined and required in J2945/1;

tracking individual surrounding vehicles in the vicinity of the host vehicle and identifying which vehicles may pose a potential threat to the host vehicle; and maintaining previous surrounding vehicle information for specific safety application algorithm usage.

The length of DE_TemporaryID is defined as 4 octets (or 32 bits), so there is a $1/2^{32}$ probability where any two DSRC systems will select the identical DE_TemporaryID value when randomly setting an ID number. If one or more surrounding vehicles coincidently set the identical DE_TemporaryID value, the DSRC system may inadvertently overwrite each other within the internal data structures. As a result, the vehicle tracking algorithms and safety applications may not recognize the existence of all the nearby surrounding vehicles, and therefore may not detect important V2V safety threats.

In view of the above, it is an object of the present disclosure to provide an apparatus that accurately detects a duplicate temporary ID situation between surrounding vehicles. It is another object of the present disclosure to provide a method for accurately detecting a duplicate temporary ID situation between surrounding vehicles.

SUMMARY

This section provides a general summary of the disclosure, and is not a comprehensive disclosure of its full scope or all of its features.

In a first aspect of the present disclosure, an apparatus is mounted on a host vehicle to detect a duplicate temporary ID in basic safety messages (BSMs) over a dedicated short range communications (DSRC). The apparatus includes a receiver and a duplication identifier. The receiver is configured to receive the BSMs from surrounding vehicles through packet transmission. The duplication identifier is configured to identify the duplicate temporary ID based on the BSMs having an identical temporary ID value commonly used by at least two surrounding vehicles. The apparatus further includes a locater and an absolute distance calculator. The locater is configured to detect a location for each of the packets from which each of the packets is transmitted based on locational information contained in each of the packets. The absolute distance calculator is configured to calculate an absolute distance between the locations for two successive packets having the identical temporary ID value. The duplication identifier is configured to identify the duplicate temporary ID when the absolute distance calculated by the absolute distance calculator is greater than an absolute distance threshold.

In a second aspect of the present disclosure, an apparatus is mounted on a host vehicle to detect a duplicate temporary ID in basic safety messages (BSMs) over a dedicated short range communications (DSRC). The apparatus includes a receiver and a duplication identifier. The receiver is configured to receive the BSMs from surrounding vehicles through packet transmission. The duplication identifier is configured to identify the duplicate temporary ID based on the BSMs having an identical temporary ID value commonly used by at least two surrounding vehicles. The apparatus further includes a locater, a convertor, and a relative distance calculator. The locater is configured to detect a location for each of the packets from which each of the packets is transmitted based on locational information contained in each of the packets. The convertor is configured to convert the location for each of the packets into an X coordinate location relative to the host vehicle and a Y coordinate location relative to the host vehicle. The relative distance calculator is configured to calculate a relative X coordinate distance between the X coordinate locations for two successive packets having the identical temporary ID value and a relative Y coordinate distance between the Y coordinate locations for the two successive packets. The duplication identifier is configured to identify the duplicate temporary ID when at least one of the relative X coordinate distance and the relative Y coordinate distance is greater than a relative distance threshold.

In a third aspect of the present disclosure, an apparatus is mounted on a host vehicle to detect a duplicate temporary ID in basic safety messages (BSMs) over a dedicated short range communications (DSRC). The apparatus includes a receiver and a duplication identifier. The receiver is configured to receive the BSMs from surrounding vehicles through packet transmission. The duplication identifier is configured to identify the duplicate temporary ID based on the BSMs having an identical temporary ID value commonly used by at least two surrounding vehicles. The apparatus further includes a locater, a location estimator, and a deviation calculator. The locater is configured to detect a location for each of the packets, including a first packet and a second packet, from which each of the packets is transmitted based on locational information contained in each of the packets, the first packet and the second packet being successively received by the receiver in this order. The location estimator is configured to estimate a projected location for the second packet based on the location for the first packet detected by the locator, speed information contained in the first packet, heading information contained in the first packet, and a time difference between the first packet and the second packet. The deviation calculator is configured to calculate a deviation between the location for the second packet detected by the locator and the projected location estimated by the location estimator. The duplication identifier is configured to identify the duplicate temporary ID when the deviation calculated by the deviation calculator is greater than a deviation threshold.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. In the drawings.

Figure 8:
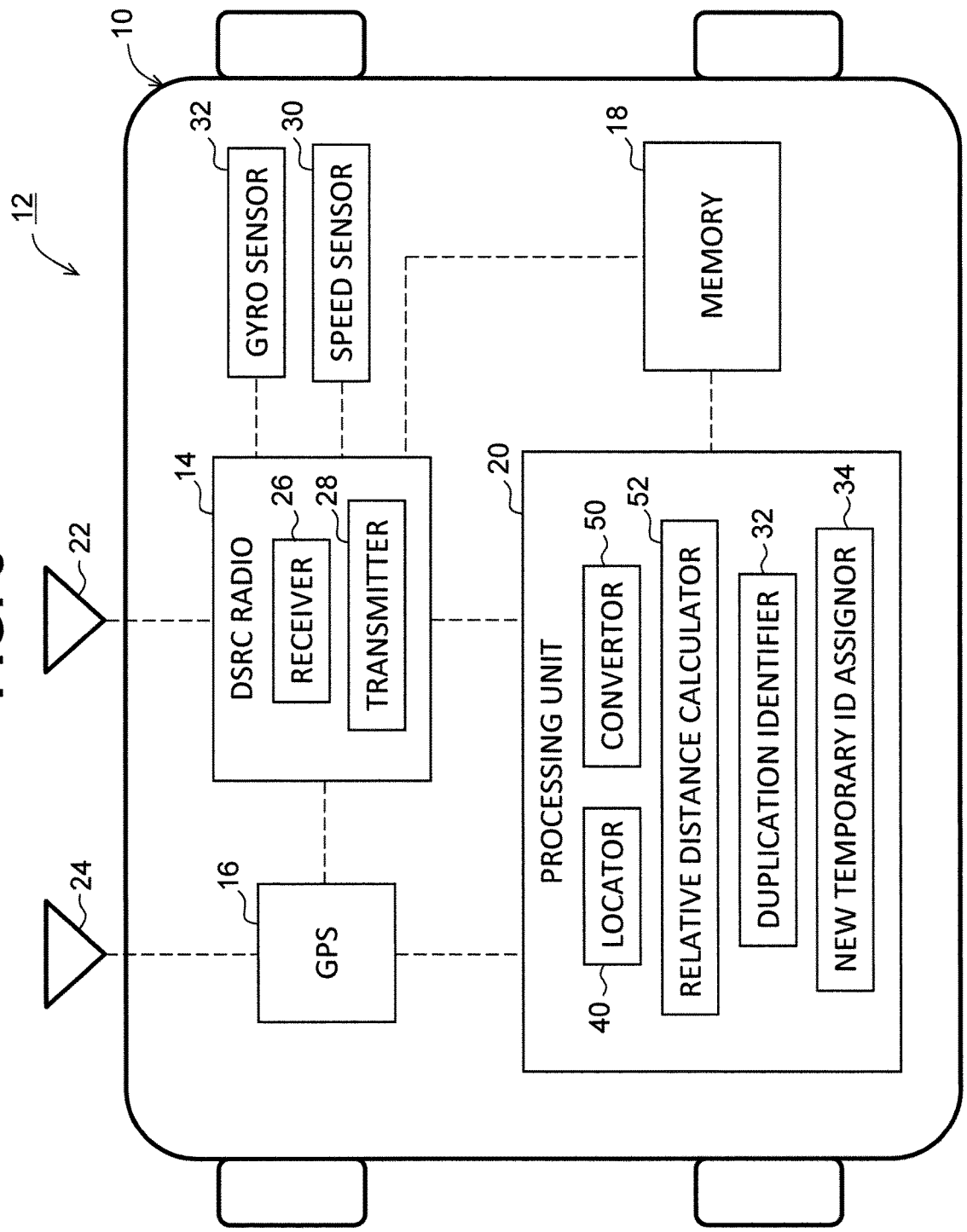
Figure 9:
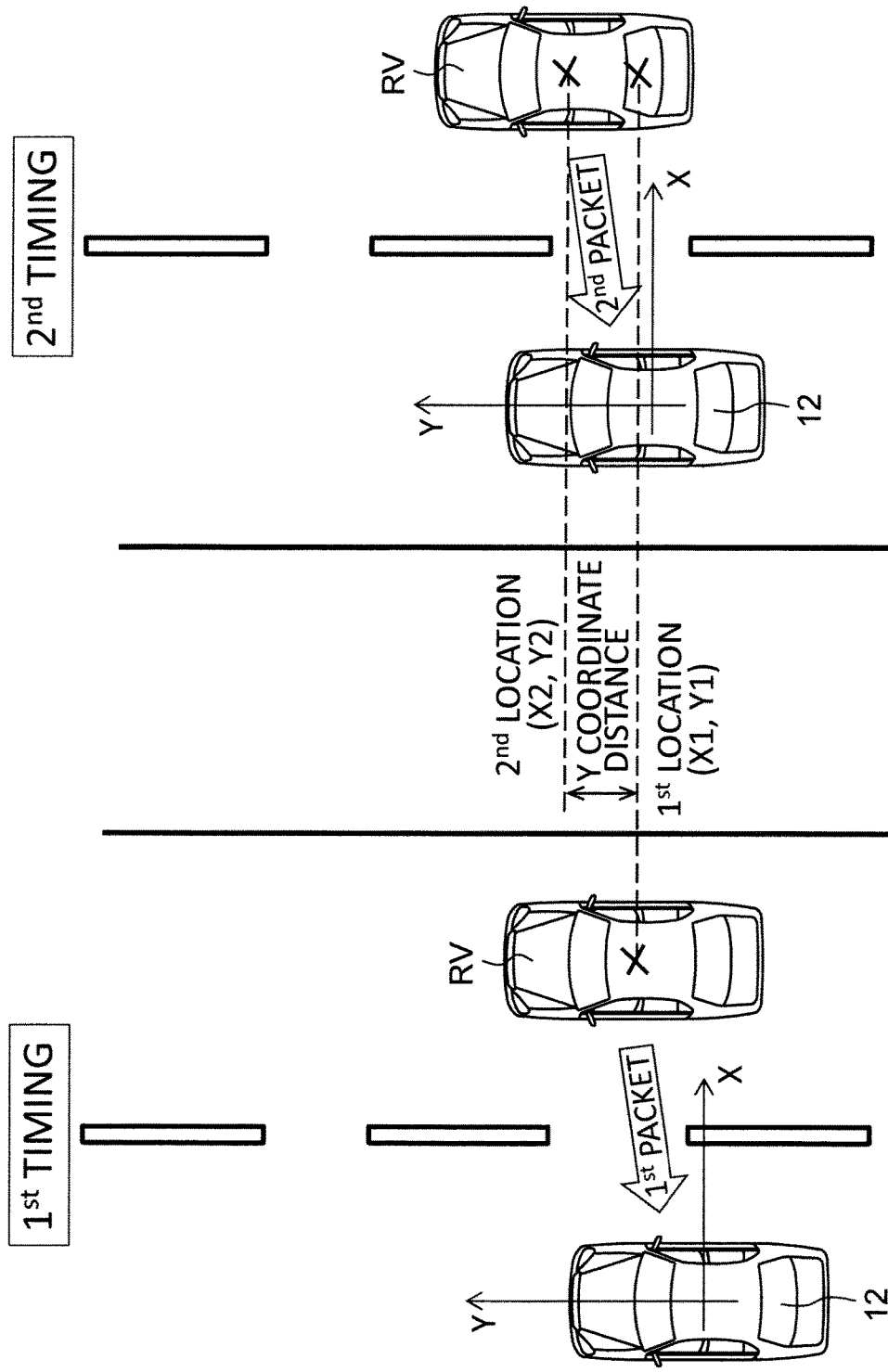
Figure 10:
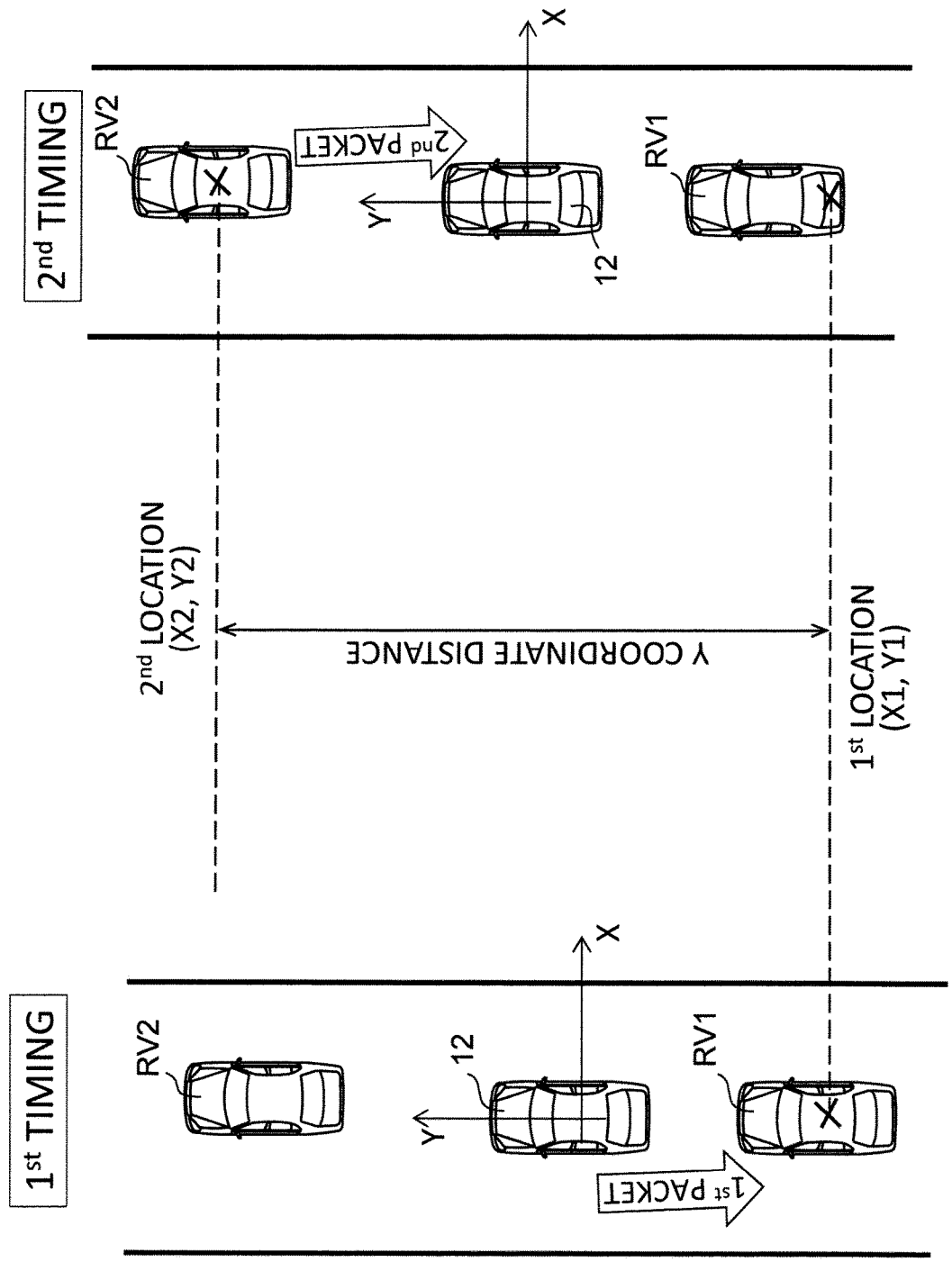
Figure 11:
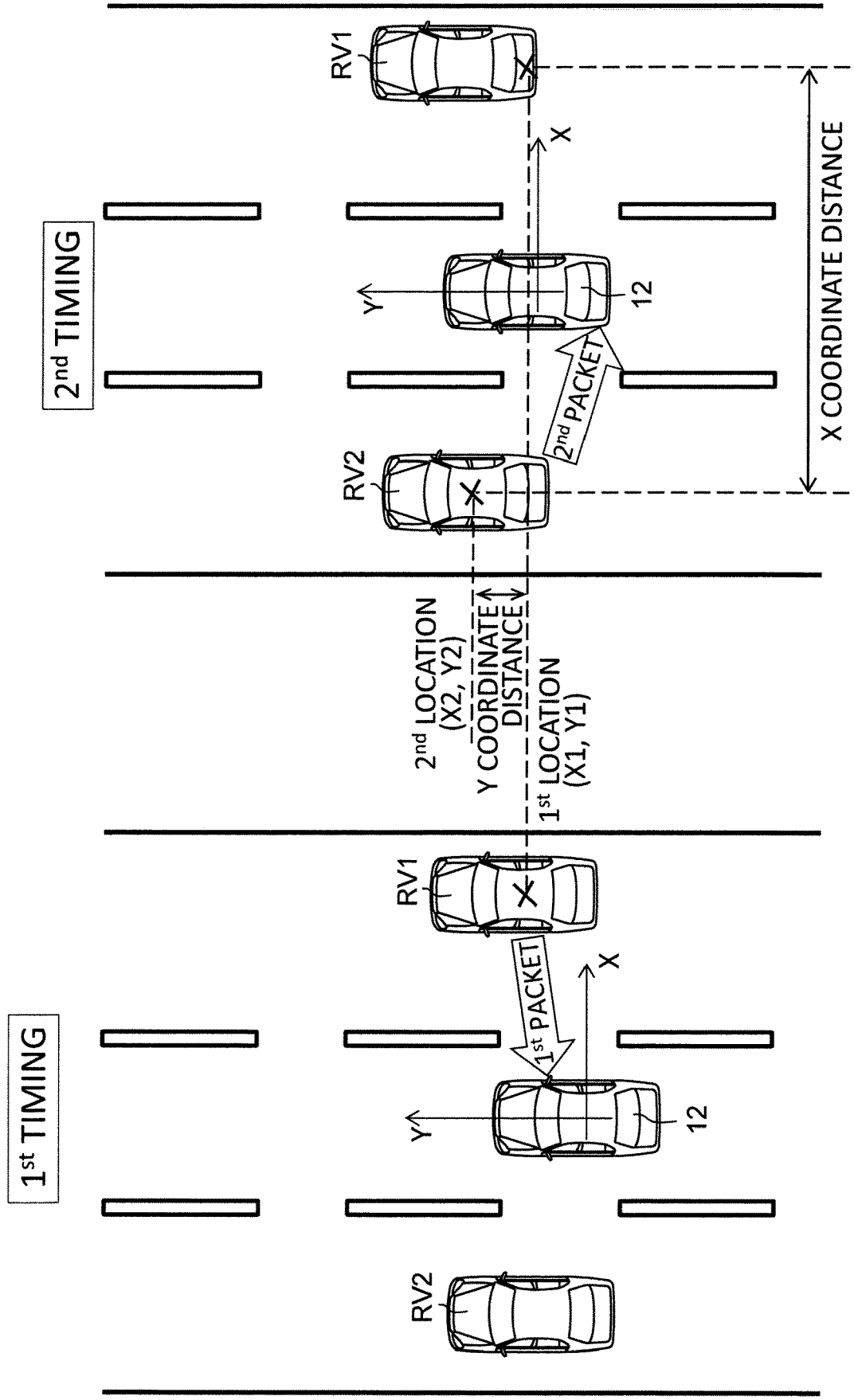
Figure 12:
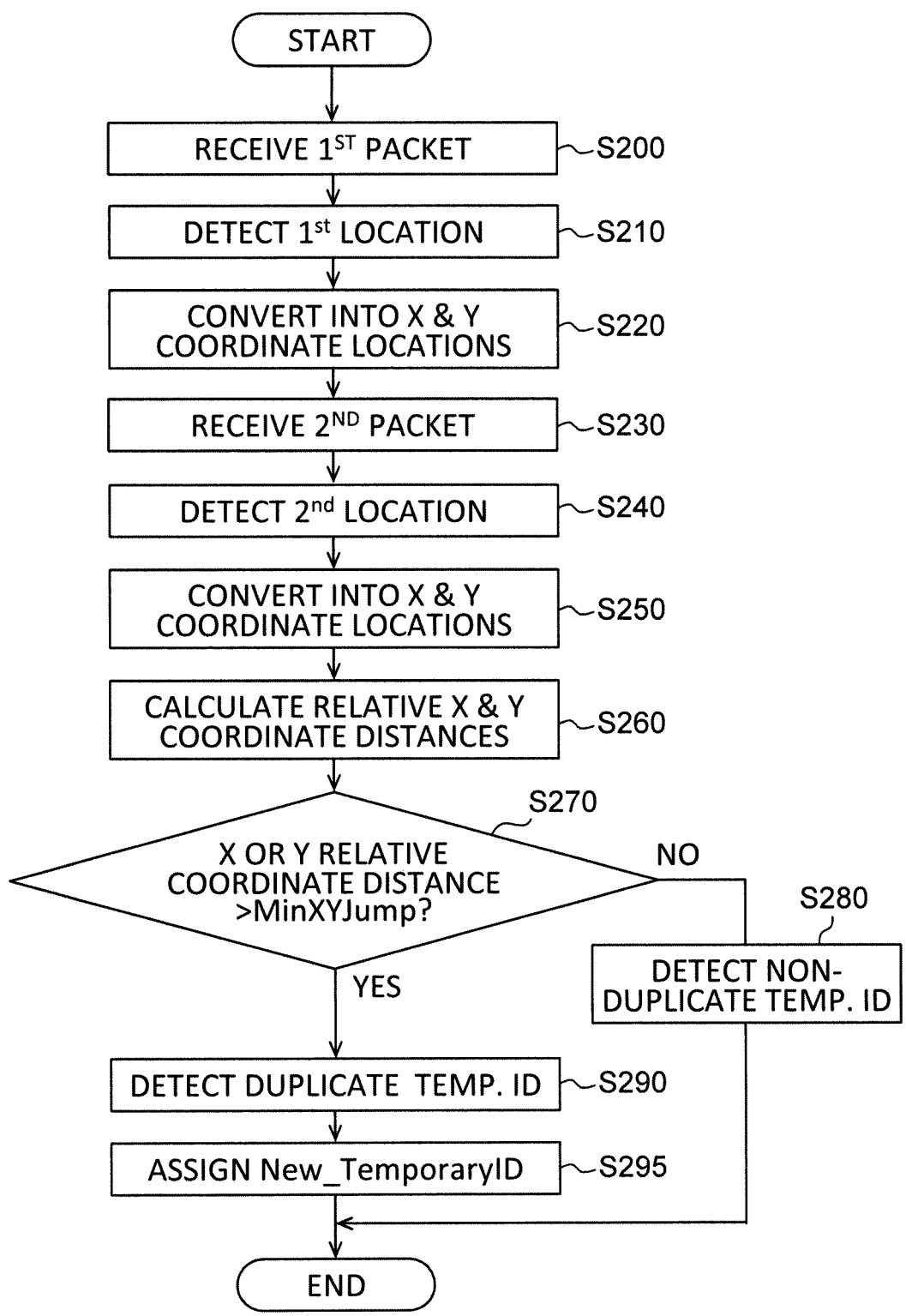
Figure 13:
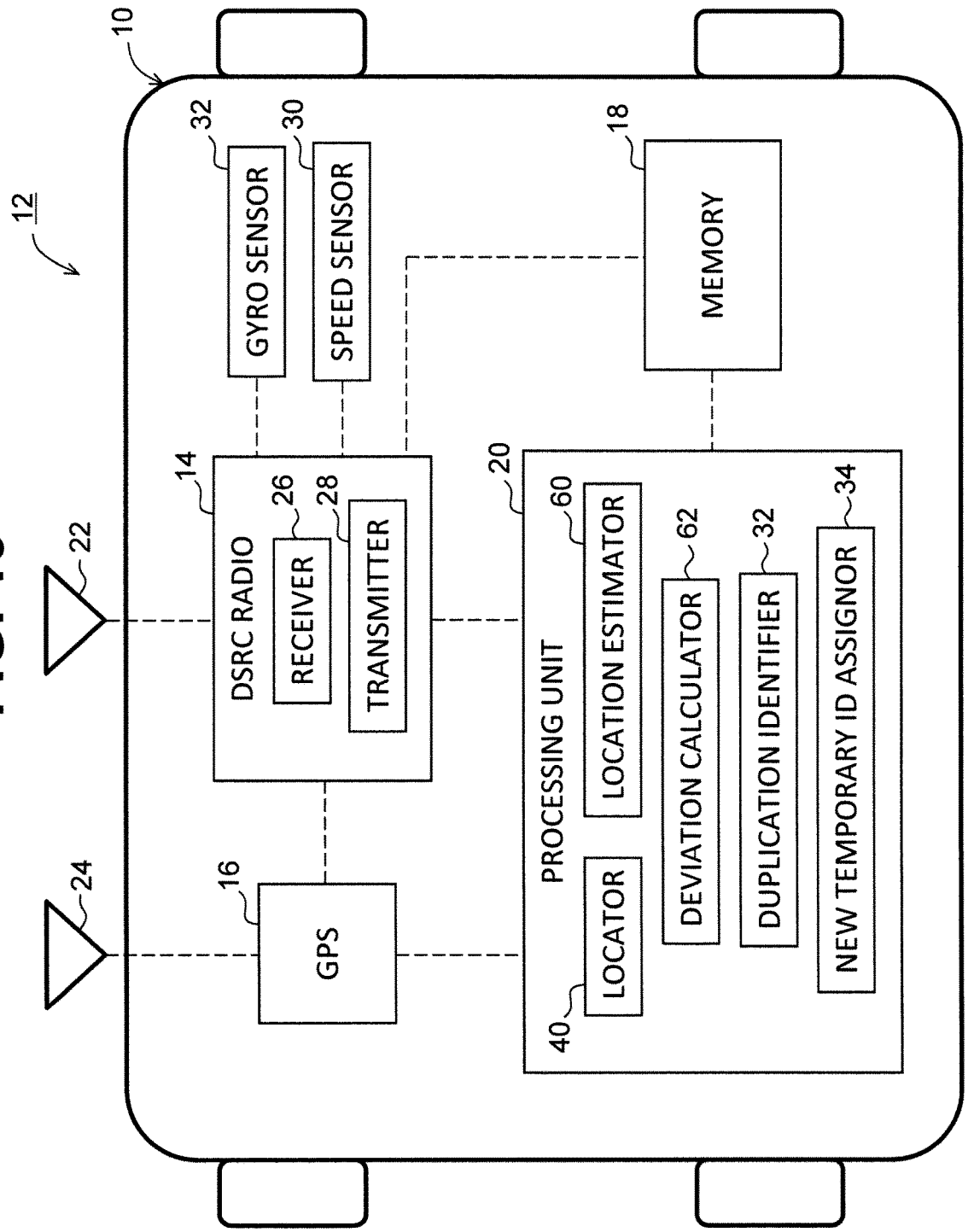
Figure 14:
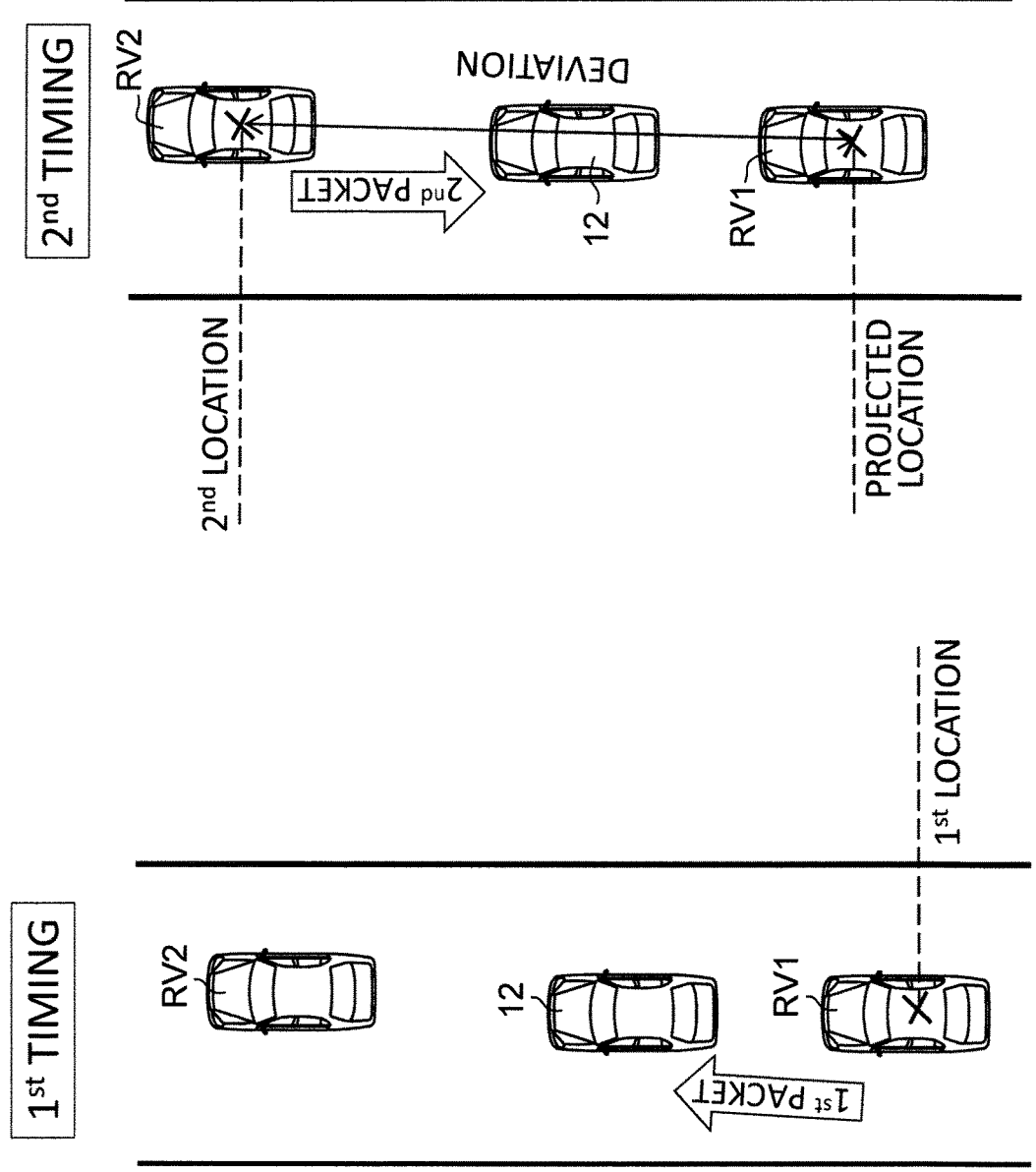
Figure 15:
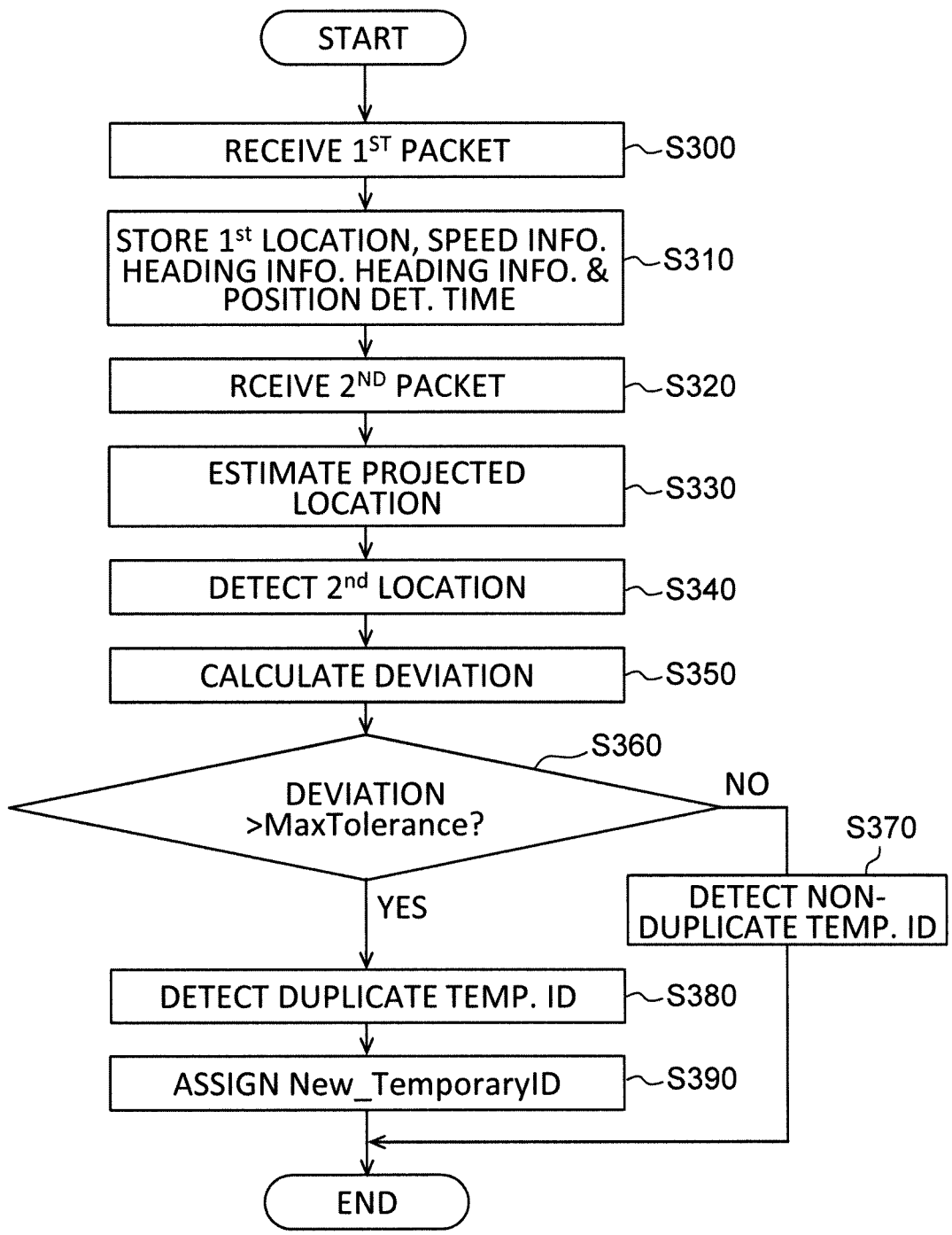

FIG. 8 a block diagram of a DSRC system according to a third embodiment;

FIG. 9 is a diagram illustrating a non-duplicate temporary ID situation at a first timing and a second timing according to the third embodiment;

FIG. 10 is a diagram illustrating a duplicate temporary ID situation where the host vehicle and two surrounding vehicles are in line at a first timing and a second timing according to the third embodiment;

FIG. 11 is a diagram illustrating a duplicate temporary ID situation where the host vehicle and two surrounding vehicles are in parallel at a first timing and a second timing according to the third embodiment;

FIG. 12 is a flowchart of operation of the DRSC system according to the third embodiment;

FIG. 13 a block diagram of a DSRC system according to a fourth embodiment;

FIG. 14 is a diagram illustrating a duplicate temporary ID situation where the host vehicle and two surrounding vehicles are in line at a first timing and a second timing according to the fourth embodiment; and FIG. 15 is a flowchart of operation of the DRSC system according to the fourth embodiment.

DETAILED DESCRIPTION

As follows, a plurality of embodiments of the present disclosure will be described with reference to drawings. It will be apparent to those skilled in the art from this disclosure that the following descriptions of the embodiments are provided for illustration only and not for the purpose of limiting the invention as defined by the appended claims and their equivalents. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts may be combined. The embodiments may be partially combined even if it is not explicitly described that the embodiments may be combined, provided there is no harm in the combination.

In the following embodiments, an apparatus for detecting a duplicate temporary ID will be described as a dedicated short range communications (DSRC) system. Further, a method for detecting the duplicate temporary ID will be described as a process executed by the DSRC system in the following embodiments.

First Embodiment

Figure 1:
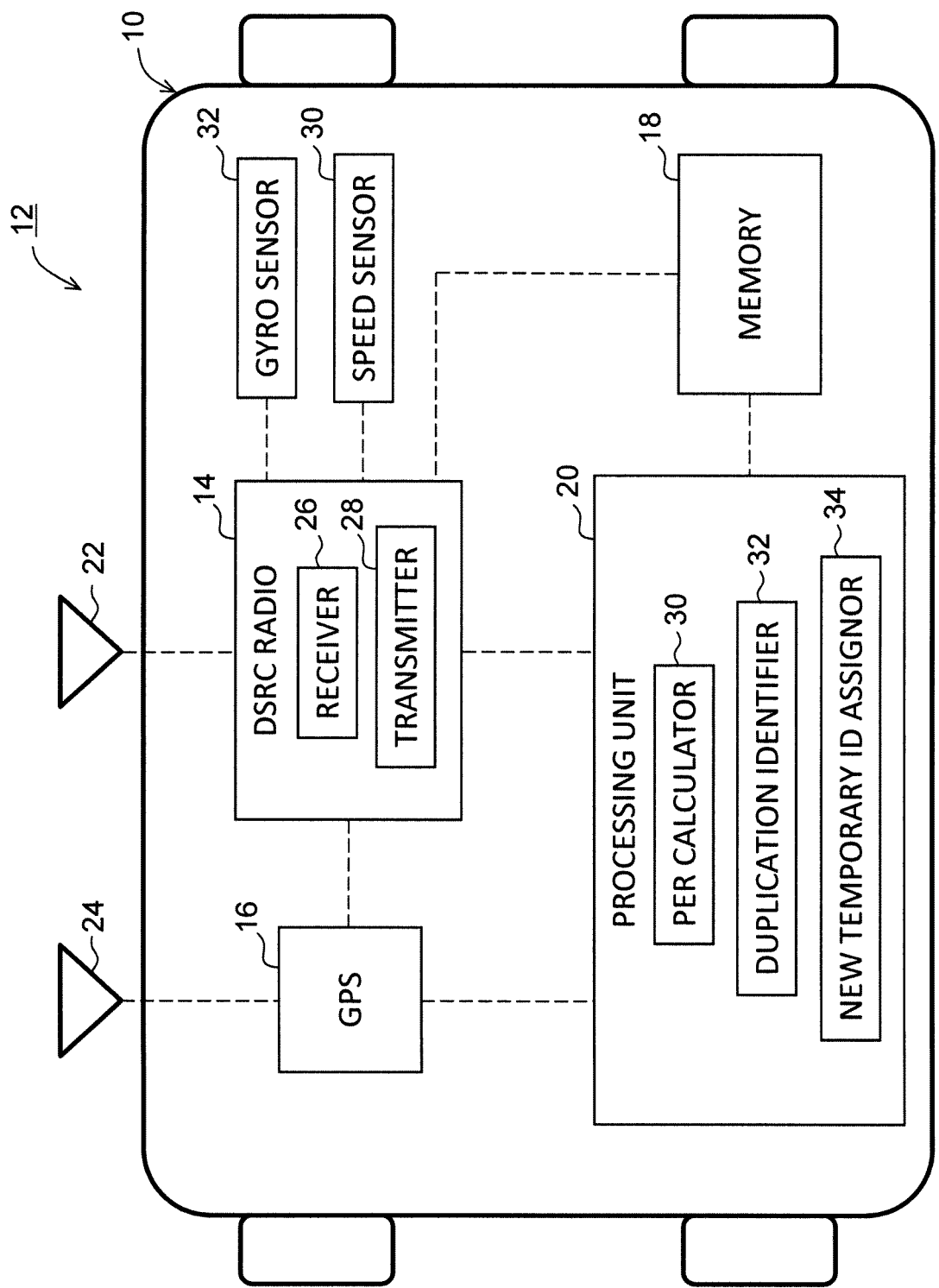
FIG. 1 is a block diagram of a DSRC system according to a first embodiment.

FIG. 1 is a block diagram illustrating the DSRC system 10 mounted to a host vehicle 12. The DSRC system 10 generally includes a DSRC radio 14, a global positioning system (GPS) 16, a memory 18, and a processing unit 20. The host vehicle 12 is also equipped with a DSRC antenna 22 and a GPS antenna 24 that are attached to, e.g., a windshield or roof of the host vehicle 12.

Figure 2:
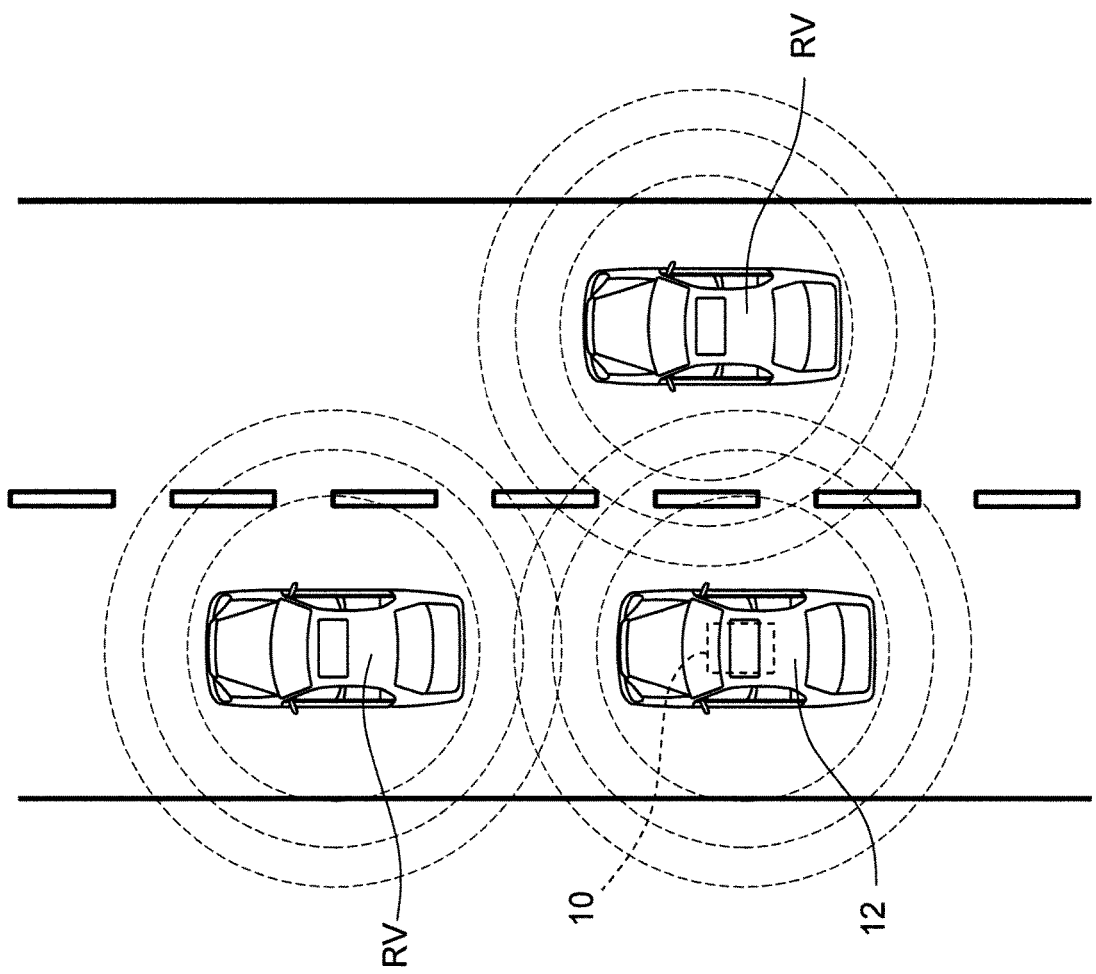
FIG. 2 is a diagram illustrating V2V communications between a host vehicle and surrounding vehicles.

As shown in FIG. 2, the DSRC radio 14 is configured to transmit and receive basic safety messages (BSMs) to/from surrounding remote vehicles (hereinafter, referred to as a "surrounding vehicle RV") that are also equipped with similar DSRC systems (i.e., Vehicle-to-Vehicle (V2V) communication systems). The DSRC radio 14 can also transmit and receive BSMs to/from infrastructures (not shown) equipped with a V2X (Vehicle-to-Infrastructure) system.

More specifically, the DSRC radio 14 includes a receiver 26 and a transmitter 28, both of which are connected to the DSRC antenna 22. The receiver 26 serves to receive BSMs transmitted from surrounding vehicles RV and/or infrastructures through the DSRC antenna 22, whereas the transmitter 28 serves to transmit BSMs from the host vehicle 12 through the DSRC antenna 22. The receiver 26 receives packets of BSMs from surrounding vehicles RV and/or infrastructures, and the transmitter 28 transmits packets of BSMs from the host vehicle 12.

In this way, the DSRC radio 14 communicates with surrounding vehicles RV and infrastructures through packets transmission. The transmitter 28 transmits packets of BSMs at a specified rate (e.g., 10 Hz). Hereinafter, the packet transmission rate of the transmitter 28 is referred to as a "HV Tx rate". It should be noted that DSRC systems of surrounding vehicles RV also communicate with the host vehicle 12 through packets transmission. Therefore, as with the host vehicle 12, each of the DSRC systems of surrounding vehicles RV transmits packets of BSMs at a specified rate (hereinafter referred to as a "RV Tx rate").

The BSMs transmitted from the transmitter 28 has a field named DE_TemporaryID. The value of the DE_TemporaryID is set by the DSRC system 10 when security certificates for the DSRC system 10 are set. The DE_TemporaryID contained in each of BSMs transmitted from the host vehicle 12 has an identical value, and the DSRC system 10 maintains the value until the security certificates will be changed next time. Hereinafter, the value of the DE_TemporaryID will be referred to as a "temporary ID value". As with the host vehicle 12, BSMs transmitted from surrounding vehicles RV also have their own DE_temporaryID, and the temporary ID value of one of surrounding vehicles RV is usually different from the temporary ID value of others of surrounding vehicles RV.

Each BSM transmitted from the host vehicle 12 also has a field named DE_MsgCount (referred to here as MsgCount). This MsgCount has an integer value assigned to each packet of the BSM from 0 to 127. The value is incremented by 1 count for each packet and returned to 0 after reaching 127. Likewise, each BSM transmitted from surrounding vehicles RV also contains an MsgCount field having an integer value from 0 to 127.

As shown in FIG. 1, the DSRC radio 14 is connected to a speed sensor 30 and a gyro sensor 32 that are mounted to the host vehicle 12. The speed sensor 30 is configured to detect vehicle speed of the host vehicle 12. The speed sensor 30 transmits the vehicle speed as "speed information" to the DSRC radio 14. The gyro sensor 32 is configured to detect heading of the host vehicle 12. The gyro sensor 32 transmits the heading as "heading information" of the host vehicle 12 to the DSRC radio 14.

The GPS 16 is connected to the GPS antenna 24 to receive positional information of the host vehicle 12 from a GPS satellite (not shown). The positional information includes a latitude and a longitude of the host vehicle 12. The positional information also includes a position determination time corresponding to when the position of the host vehicle 12 is determined. The GPS 16 transmits the positional information to the DSRC radio 14.

In this way, the DSRC radio 14 inputs the positional information, the speed information, and the heading information. Then, the DSRC radio 14 (the transmitter 28) transmits BSMs containing the positional information, the speed information, and the heading information to surrounding vehicles RV and/or infrastructures. Likewise, BSMs transmitted from surrounding vehicles RV also contain at least positional information (including the position determination time), speed information, and heading information regarding the surrounding vehicles RV.

The memory 18 may include a random access memory (RAM) and read-only memory (ROM). The memory 18 may store computer-readable, computer-executable software code (i.e., programs) containing instructions that are executed by the processing unit 20 to perform various functions described herein. The memory 18 also temporarily stores BSMs received from surrounding vehicles RV and infrastructures. More specifically, the memory 18 stores packets of BSMs in a structure pointed (or referenced) by the DE_TemporaryID. Therefore, packets of BSMs having a temporary ID value and packets of BSMs having a different temporary ID value are separately stored in structures defined in the memory 18. In other words, packets of BSMs having an identical temporary ID value are stored in the same structure of the memory 18 as the same messages even if the BSMs are transmitted from different sites. The memory 18 also stores the MsgCount assigned to each packet in association with the DE_TemporaryID.

Here, the following table (Table 1) shows one example of BSMs being received by the DSRC system 10 of the host vehicle 12 that are transmitted from one surrounding vehicle RV (RV1). As shown in Table 1, the receiver 26 receives packets every 100 ms from time 100 ms to 2000 ms. In other words, the RV Tx rate of the surrounding vehicle RV1 is 100 ms. Each packet contains the MsgCount with a value of from 1 to 20, and the memory 18 stores the MsgCount of the each packet every time the receiver 26 receives the packet as shown in the column of "HV Rx MsgCnt".

TABLE 1

| Time (ms) | RV1 Tx MsgCnt | HV Rx MsgCnt | Lost Packets from last reception | CLP over past second | CRP over past second | TP over past second | PER over past second |
|---|---|---|---|---|---|---|---|
| 100 | 1 | 1 | | 0 | — | — | — |
| 200 | 2 | 2 | 0 | 0 | — | — | — |
| 300 | 3 | 3 | 0 | 0 | — | — | — |
| 400 | 4 | 4 | 0 | 0 | — | — | — |
| 500 | 5 | 5 | 0 | 0 | — | — | — |
| 600 | 6 | 6 | 0 | 0 | — | — | — |
| 700 | 7 | 7 | 0 | 0 | — | — | — |
| 800 | 8 | 8 | 0 | 0 | — | — | — |
| 900 | 9 | 9 | 0 | 0 | — | — | — |
| 1000 | 10 | 10 | 0 | 0 | 10 | 10 | 0 |
| 1100 | 11 | 11 | 0 | 0 | 10 | 10 | 0 |
| 1200 | 12 | 12 | 0 | 0 | 10 | 10 | 0 |
| 1300 | 13 | 13 | 0 | 0 | 10 | 10 | 0 |
| 1400 | 14 | 14 | 0 | 0 | 10 | 10 | 0 |
| 1500 | 15 | 15 | 0 | 0 | 10 | 10 | 0 |
| 1600 | 16 | 16 | 0 | 0 | 10 | 10 | 0 |
| 1700 | 17 | 17 | 0 | 0 | 10 | 10 | 0 |
| 1800 | 18 | 18 | 0 | 0 | 10 | 10 | 0 |
| 1900 | 19 | 19 | 0 | 0 | 10 | 10 | 0 |
| 2000 | 20 | 20 | 0 | 0 | 10 | 10 | 0 |

The DSRC system 10 stores the BSMs in association with the DE_TemporaryID (i.e., stored in a structure in the memory 18 pointed by the DE_TemporaryID). Hence, even if the DSRC system 10 receives BSMs from two or more surrounding vehicles RV, the DSRC system 10 can distinguishably recognize BSMs transmitted from one surrounding vehicle RV from another as long as each DE_TemporaryID is different from each other. However, if the host vehicle 12 receives BSMs coincidently having an identical temporary ID value from a plurality of surrounding vehicles RV, the DSRC system 10 of the host vehicle 12 would mistakenly recognize BSMs as the same message source (i.e., these messages come from the same surrounding vehicle RV) because of their identical temporary ID values.

Hereinafter, a situation where BSMs transmitted from two or more surrounding vehicles RV have an identical temporary ID value is referred to as a "duplicate temporary ID situation".

duplicate temporary ID situation occurs, the DSRC system 10 stores MsgCount values, which were originally assigned to different BSMs, altogether in the same structure of the memory 18.

TABLE 2

| Time (ms) | RV1 Tx MsgCnt | RV2 Tx MsgCnt | HV Rx MsgCnt | Lost Packets from last reception | CLP over past second | CRP over past second | TP over past second | PER over past second |
|---|---|---|---|---|---|---|---|---|
| 0 | | | | | — | — | — | — |
| 100 | 1 | | 1 | 0 | | — | — | — |
| 150 | | 1 | 1 | 127 | 127 | — | — | — |
| 200 | 2 | | 2 | 0 | 127 | — | — | — |
| 250 | | 2 | 2 | 127 | 254 | — | — | — |
| 300 | 3 | | 3 | 0 | 254 | — | — | — |
| 350 | | 3 | 3 | 127 | 381 | — | — | — |
| 400 | 4 | | 4 | 0 | 381 | — | — | — |
| 450 | | 4 | 4 | 127 | 508 | — | — | — |
| 500 | 5 | | 5 | 0 | 508 | — | — | — |
| 550 | | 5 | 5 | 127 | 635 | — | — | — |
| 600 | 6 | | 6 | 0 | 635 | — | — | — |
| 650 | | 6 | 6 | 127 | 762 | — | — | — |
| 700 | 7 | | 7 | 0 | 762 | — | — | — |
| 750 | | 7 | 7 | 127 | 889 | — | — | — |
| 800 | 8 | | 8 | 0 | 889 | — | — | — |
| 850 | | 8 | 8 | 127 | 1016 | — | — | — |
| 900 | 9 | | 9 | 0 | 1016 | — | — | — |
| 950 | | 9 | 9 | 127 | 1143 | — | — | — |
| 1000 | 10 | | 10 | 0 | 1143 | 19 | 1162 | 0.9836489 |
| 1050 | | 10 | 10 | 127 | 1270 | 19 | 1289 | 0.9852599 |
| 1100 | 11 | | 11 | 0 | 1143 | 19 | 1162 | 0.9836489 |
| 1150 | | 11 | 11 | 127 | 1270 | 19 | 1289 | 0.9852599 |
| 1200 | 12 | | 12 | 0 | 1143 | 19 | 1162 | 0.9836489 |
| 1250 | | 12 | 12 | 127 | 1270 | 19 | 1289 | 0.9852599 |
| 1300 | 13 | | 13 | 0 | 1143 | 19 | 1162 | 0.9836489 |
| 1350 | | 13 | 13 | 127 | 1270 | 19 | 1289 | 0.9852599 |
| 1400 | 14 | | 14 | 0 | 1143 | 19 | 1162 | 0.9836489 |
| 1450 | | 14 | 14 | 127 | 1270 | 19 | 1289 | 0.9852599 |
| 1500 | 15 | | 15 | 0 | 1143 | 19 | 1162 | 0.9836489 |
| 1550 | | 15 | 15 | 127 | 1270 | 19 | 1289 | 0.9852599 |
| 1600 | 16 | | 16 | 0 | 1143 | 19 | 1162 | 0.9836489 |
| 1650 | | 16 | 16 | 127 | 1270 | 19 | 1289 | 0.9852599 |
| 1700 | 17 | | 17 | 0 | 1143 | 19 | 1162 | 0.9836489 |
| 1750 | | 17 | 17 | 127 | 1270 | 19 | 1289 | 0.9852599 |
| 1800 | 18 | | 18 | 0 | 1143 | 19 | 1162 | 0.9836489 |
| 1850 | | 18 | 18 | 127 | 1270 | 19 | 1289 | 0.9852599 |
| 1900 | 19 | | 19 | 0 | 1143 | 19 | 1162 | 0.9836489 |
| 1950 | | 19 | 19 | 127 | 1270 | 19 | 1289 | 0.9852599 |
| 2000 | 20 | | 20 | 0 | 1143 | 19 | 1162 | 0.9836489 |

Next, the table 2 shows another example of BSMs being received under the duplicate temporary ID situation between two surrounding vehicles RV (a first surrounding vehicle RV1 and a second surrounding vehicle RV2). In this example, the DSRC system 10 receives packets from the first surrounding vehicle RV1 every 100 ms, starting at the time 100 ms. On the other hand, the packets from the second surrounding vehicle RV2 are received every 100 ms, starting at the time 150 ms. That is, the DSRC system 10 alternately receives packets from the first surrounding vehicle RV1 and the second surrounding vehicle RV2 every 50 ms.

In this example, each packet from the first surrounding vehicle RV1 has the MsgCount with a value from 1 to 20, whereas each packet from the second surrounding vehicle RV2 has the MsgCount with a value from 1 to 19. However, since the BSMs have an identical temporary ID value, the DSRC system 10 recognizes the BSMs as originating from the same source vehicle. As a result, as shown in the column of "HV Rx MsgCnt", the DSRC system 10 stores the packets from both the vehicles RV1 and RV2 in the same structure of the memory 18 every 50 ms. In this way, when the To handle this situation, the processing unit 20 according to the present embodiment is configured to (i) detect occurrence of a duplicate temporary ID situation and (ii) recognize distinctively the BSMs between the surrounding vehicles RV after the detection of the duplicate temporary ID situation, as will be discussed below. In the present embodiment, the processing unit 20 may be formed of a microprocessor that carries out functions by performing the programs stored in the memory 18. The processing unit 20 generally includes a packet error rate (PER) calculator 30, a duplication identifier 32, and a new temporary ID assignor 34, as shown in FIG. 1.

The PER calculator 30 is configured to calculate a PER for BSMs having an identical temporary ID value. In this embodiment, the PER is defined as a ratio of cumulative lost packets (CLP) to total packets (TP) over a specified time (i.e., PER=CLP/TP). In the present embodiment, the specified time is defined as "PERdetectionTime" and is set to 1000 ms, for example.

The PER calculator 30 first calculates lost packets from last reception. That is, the PER calculator 30 calculates lost packets between two successive packets having an identical temporary ID value. More specifically, the PER calculator 30 calculates the lost packets based on the values of the MsgCount of successively received packets stored in the memory 18. In this embodiment, the lost packets are obtained by subtracting the previous value of the MagCount and 1 from the latest value of the MsgCount (i.e., lost_packet=latest_MsgCount-previous_MsgCount-1). If the subtracted value of the lost packets is below 0, 128 is further added to the value (i.e., lost_packet=latest_MsgCount-previous_MsgCount-1+128).

Then, the PER calculator 30 calculates CLP by summing up the lost packets for the PERdetectionTime. Thereafter, the PER calculator 30 calculates the TP over the PERdetectionTime. The TP is defined as the sum of cumulative received packets (CRP) and the CLP over the PERdetectionTime (i.e., TP=CRP+CLP). The CRP is calculated by counting the number of receiving packets during the PERdetectionTime. After obtaining TP, the PER calculator 30 calculates PER by dividing CLP by TP.

For example, in the situation of Table 1 where a duplicate temporary ID situation does not occur (hereinafter, referred to as a "non-duplicate temporary ID situation"), the PER calculator 30 calculates the lost packets at 200 ms by comparing the latest value (i.e., 2) of the MsgCount and the previous value (i.e., 1) of the MsgCount (see the column of "HV Rx MsgCnt"). Hence, the lost packets at 200 ms is calculated as 0 (i.e., 2−1−1). Similarly, the lost packets at 300 ms, 400 ms, etc. are calculated as 0. As a result, the PER calculator 30 calculates CLP over the PERdetectionTime as 0 as shown in the column "CLP over past second". On the contrary, the CRP is calculated by counting the received number of packets for the PERdetectionTime as shown in the column "CRP over past second". For example, at 1000 ms, the CRP is calculated as "10" (i.e., ten packets are received over 1000 ms). Then, the calculator calculates the PER by dividing the CLP by the TP (i.e., CLP/(CLP+CRP)). Since the CLP is always 0 in this example, the PER is also calculated as 0.

In contrast, when the duplicate temporary ID situation occurs between two surrounding vehicles RV as shown in the Table 2, the PER calculator 30 calculates the PER as below. The PER calculator 30 calculates the lost packets from successively received packets. For example, at the timing of 150 ms, the PER calculator 30 calculates the lost packets as 127 (i.e., 1−1−1+128). On the contrary, at the timing of 200 ms, the lost packets is calculated as 0 (i.e., 2−1−1). Then, the PER calculator 30 calculates the CLP over the PERdetectionTime (i.e., 1000 ms). For example, at the timing of 1000 ms, the PER calculator 30 calculates the CLP as 1143 by summing up the lost packets from 100 ms to 1000 ms. Furthermore, the PER calculator 30 calculates the CRP by counting the receiving number of packets during the PERdetectionTime. For example, at the timing of 1000 ms, the PER calculator 30 calculates the CRP as 19. Thus, the PER calculator 30 calculates the TP as 1162 at 1000 ms (i.e., 1143+19). As a result, the PER is calculated as 0.9836489 at 1000 ms (i.e., 1143/1162). In this way, when the duplicate temporary ID situation occurs, the value of the PER tends to have a large value (i.e., a value close to 1).

In view of this, the duplication identifier 32 is configured to detect occurrence of the duplicate temporary ID situation when (i) the PER is greater than a PER threshold and (ii) the number of the packets received by the DSRC system 10 (i.e., the receiver 26) during the PERdetectionTime is equal to or greater than a threshold number. In this embodiment, the PER threshold is set to 0.95, for example, and the threshold number is defined as MinNumRxPkts and is set to 10, for example.

For example, in a non-duplicate temporary ID situation shown in the Table 1, the PER is 0 (i.e., less than 0.95). Therefore, even when the number of the packets received by the DSRC system 10 during the PERdetectionTime (1000 ms in this example) is 10 (i.e., equal to the MinNumRxPkts), the duplication identifier 32 does not detect occurrence of the duplicate temporary ID situation because of the small value of the PER.

On the contrary, in a duplicate temporary ID situation shown in the Table 2, the PER is calculated as either 0.9836489 or 0.9852599 (i.e., greater than the PER threshold). Furthermore, the number of packets received by the DSRC system 10 during the PERdetectionTime (1000 ms) is 19 (i.e., greater than the MinNumRxPkts). As a result, the duplication identifier 32 detects occurrence of a duplicate temporary ID situation at the timing of 1000 ms and thereafter.

The new temporary ID assignor 34 is configured to assign new temporary ID (New_TemporaryID) to BSMs transmitted from one of the two surrounding vehicles RV. More specifically, the new temporary ID assignor 34 creates a new temporary ID value within data structures in the memory 18. For example, the new temporary ID assignor 34 sets a new temporary ID value as "the original (duplicate) temporary ID value+1". If the value (the original value+1) has been already used, the new temporary ID assignor 34 continues to add the value 1 to the original value until an unused value is obtained. Then, the new temporary ID assignor 34 stores BSMs transmitted from one of the two surrounding vehicles RV into the structure pointed by the New_TemporaryID. Further, the new temporary ID assignor 34 sets a duplicate tempID Boolean value as a "marker" within the structure for both New_TemporaryID and the original DE_TemporaryID.

By setting the duplicate tempID Boolean, the DSRC system 10 may check the value for the duplicate tempID Boolean field in the structure of the memory 18. Then, if the DSRC system 10 recognizes that the duplicate tempID Boolean is set, the DSRC system 10 can effectively process BSMs subsequently received from the two surrounding vehicles RV while distinguishing BSMs from one of the two surrounding vehicles RV from BSMs from the other of the two surrounding vehicles RV.

It should be noted that the New_TemporaryID assigned by the new temporary ID assignor 34 will get removed in the same manner as the DE_TemporaryID gets removed. For example, when the DSRC system 10 does not receive new BSMs containing the DE_TemporaryID value for specified expiration time period, the New_TemporaryID may be eliminated along with the original DE_TemporaryID.

Figure 3:
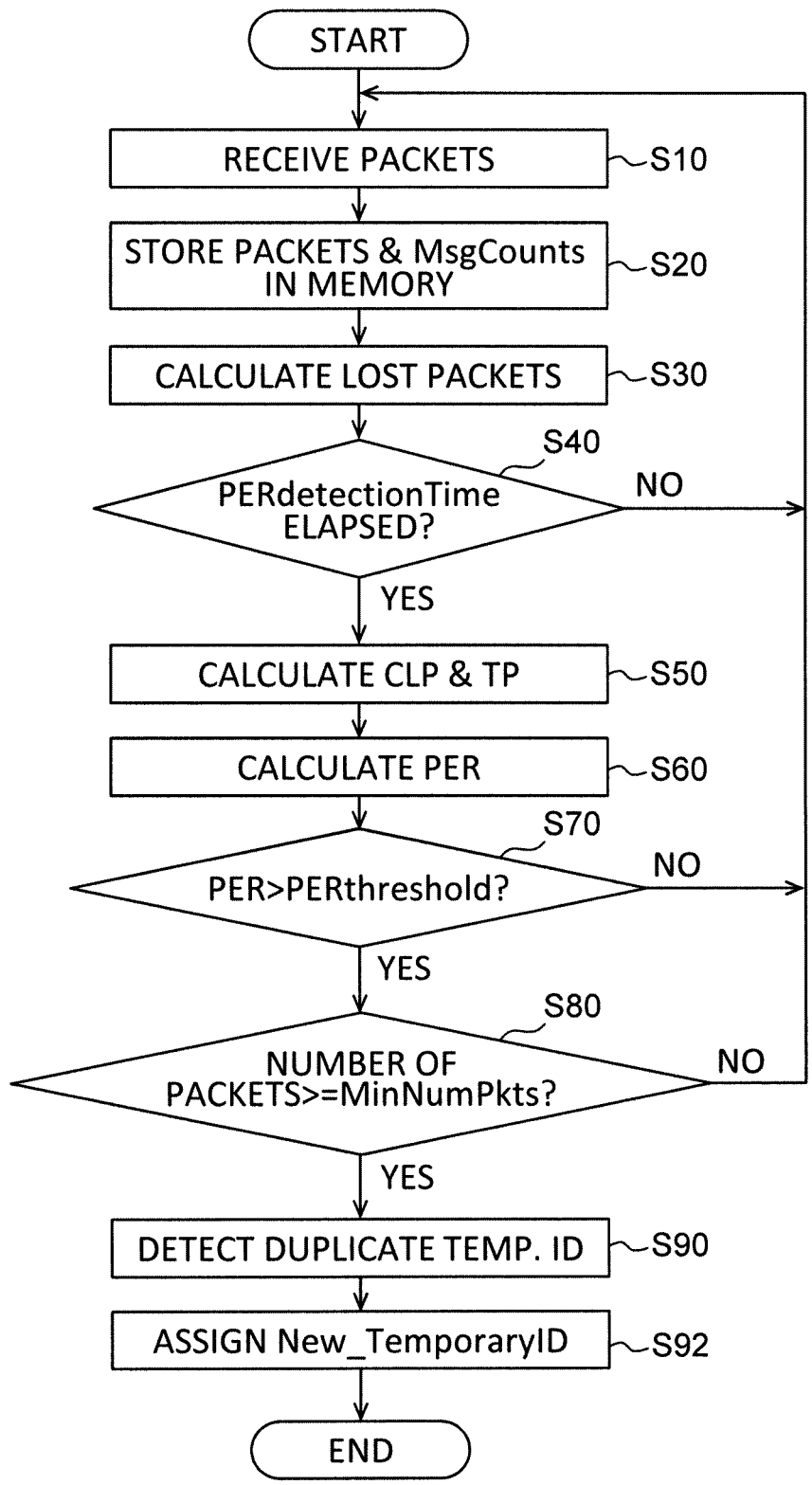
FIG. 3 is a flowchart of operation of the DRSC system according to the first embodiment.
Figure 4:
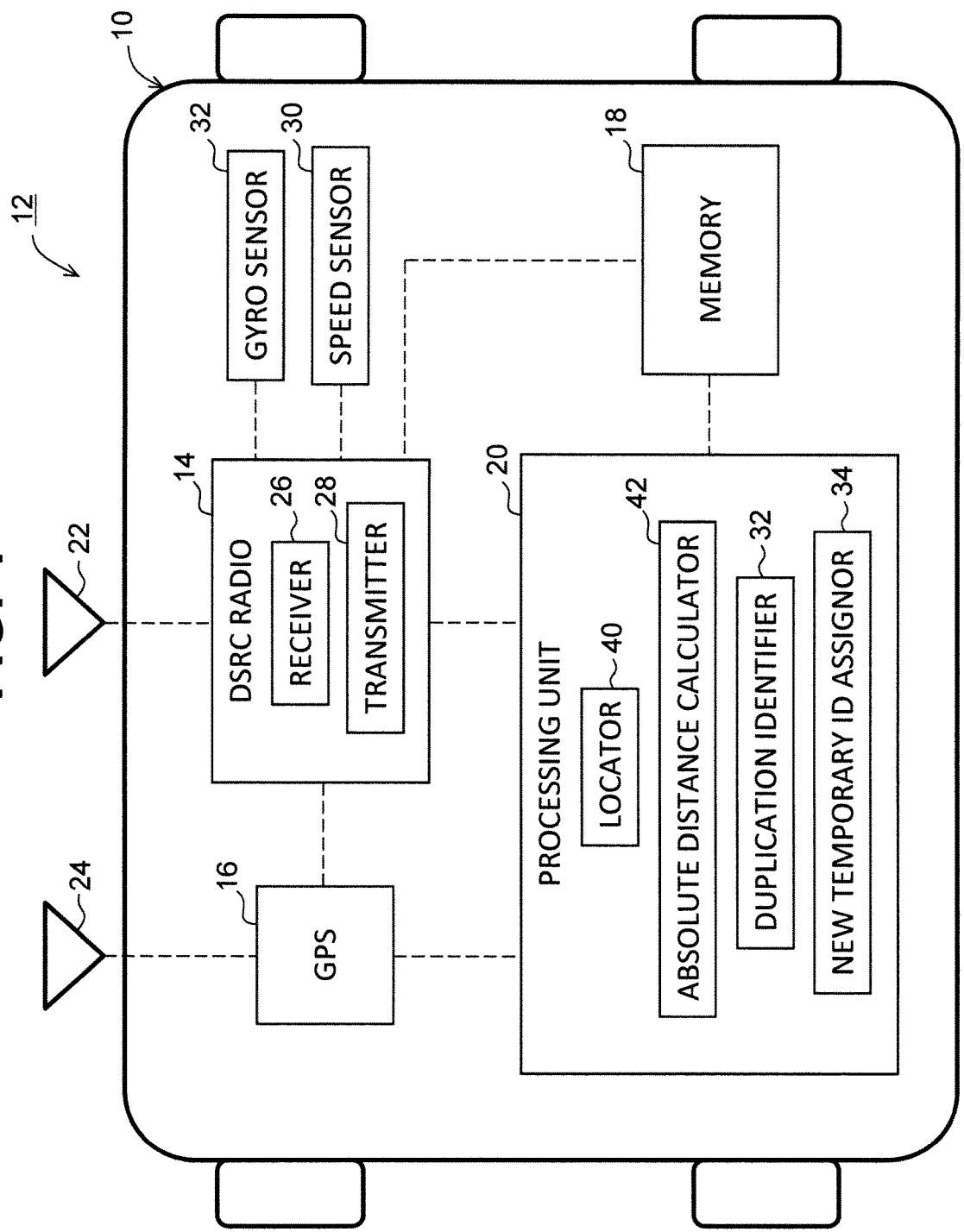
FIG. 4 is a block diagram of a DSRC system according to a second embodiment.

Next, operation of the DSRC system 10 according to the present embodiment will be described below with reference to FIG. 3. The DSRC system 10 (the processing unit 20) repeatedly performs the operation shown in the flowchart of FIG. 3.

When the DSRC radio 14 receives packets of BSMs containing a temporary ID value (Step 10), the packets are stored in the memory 18 in association with the DE_TemporaryID (Step 20). At the same time, MsgCounts contained in the packets are also stored in the memory 18 in association with the DE_TemporaryID. Then, the PER calculator 30 calculates lost packets between successively received two packets having the same DE_TemporaryID value by checking the MsgCount stored in the memory 18 at Step 30. If the PERdetectionTime (i.e., 1000 ms) does not elapse (Step 40:

No), the process returns back to Step 10. On the other hand, if the PERdetectionTime elapses (Step 40: Yes), the PER calculator 30 calculates CLP and TP at Step 50. Then, at Step 60, the PER calculator 30 calculates PER from the CLP and TP calculated at Step 40.

Next, the duplication identifier 32 determines whether the PER calculated at Step 60 is greater than the PER threshold at Step 70. If false at Step 70, the process goes back to Step 10. If true at Step 70, the duplication identifier 32 further determines whether the number of the received packets during the specified time is equal to or greater than the MinNumRxPkts (i.e., 10) at Step 80. If false at Step 80, the process goes back to Step 10. If true at Step 80, the duplication identifier 32 detects occurrence of a duplicate temporary ID situation at Step 90. After detecting the duplicate temporary ID situation, the new temporary ID assignor 34 assigns New_TemporaryID to the BSMs transmitted from one of the surrounding vehicles RV at Step 92. Specifically, the new temporary ID assignor 34 creates a new temporary ID value by adding 1 to the original temporary ID value. Furthermore, the new temporary ID assignor 34 sets a duplicate tempID Boolean value within the structure of the memory 18. Thereafter, the DSRC system 10 (the processing unit 20) processes BSMs from the two surrounding vehicles RV with reference to the duplicate tempID Boolean value.

As described above, the DSRC system 10 is configured to be capable of detecting occurrence of a duplicate temporary ID situation. Furthermore, once the DSRC system 10 detects the duplicate temporary ID situation, the DSRC system 10 assigns New_TemporaryID to BSMs from one of the two surrounding vehicles RV. Accordingly, the DSRC system 10 can distinguishably recognize the BSMs from the one of two surrounding vehicles RV from the BSMs from the other of the two surrounding vehicles RV. Furthermore, the new temporary ID assignor 34 sets a duplicate tempID Boolean value as a marker in the memory 18, and thus processing data of BSMs by the processing unit 20 after detecting the duplicate temporary ID situation can be effectively performed.

The duplication identifier 32 is configured to identify the duplicate temporary ID situation based on the PER calculated by the PER calculator 30. The PER calculator 30 calculates the PER using packets received over a certain time period (i.e., the PERdetectionTime). Therefore, accuracy of the PER calculated can increase as compared to a situation where the PER is calculated based on only packets that are instantaneously received. As a result, the duplicate temporary ID situation can be also accurately detected.

Furthermore, occurrence of the duplicate temporary ID situation is detected by the duplication identifier 32 when the number of packets the DSRC system 10 received during the PERdetectionTime is equal to or greater than the MinNumRxPkts in addition to the PER value condition. In other words, at least a certain number of the packets are used to determine the duplicate temporary ID situation. Therefore, accuracy of determining a duplicate temporary ID situation can be further increased as compared to a situation where a few packets are used for the determination.

Second Embodiment

Next, the DSRC system 10 according to the second embodiment will be described with reference to FIGS. 4 to 7. In the second embodiment, the processing unit 20 includes a locator 40 and an absolute distance calculator 42 as shown in the block diagram of FIG. 4 instead of the PER calculator 30 described in the first embodiment.

The locator 40 is configured to detect a location for each packet from which each of the packets is transmitted. As described in the first embodiment, each BSM (each packet) transmitted from a DSRC system 10 of a surrounding vehicle RV contains the locational information (i.e., a latitude and a longitude). Therefore, the locator 40 can identify the location of the "site" (i.e., the surrounding vehicle) of each packet based on the locational information contained in the packet. The location detected by the locator 40 is stored in the memory 18 for each of the packets in association with DE_TemporaryID.

The absolute distance calculator 42 is configured to calculate a distance (hereinafter, referred to as an "absolute distance") between two locations for two packets that are received by the DSRC system 10 and that have an identical temporary ID value. For example, when the DSRC system 10 receives a first packet at a first timing and then later receives a second packet at a second timing and when the first packet and the second packet have an identical temporary ID value, the absolute distance calculator 42 calculates a distance between a first location, from which the first packet was transferred at the first timing, and a second location, from which the second packet was transferred at the second timing.

Figure 5:
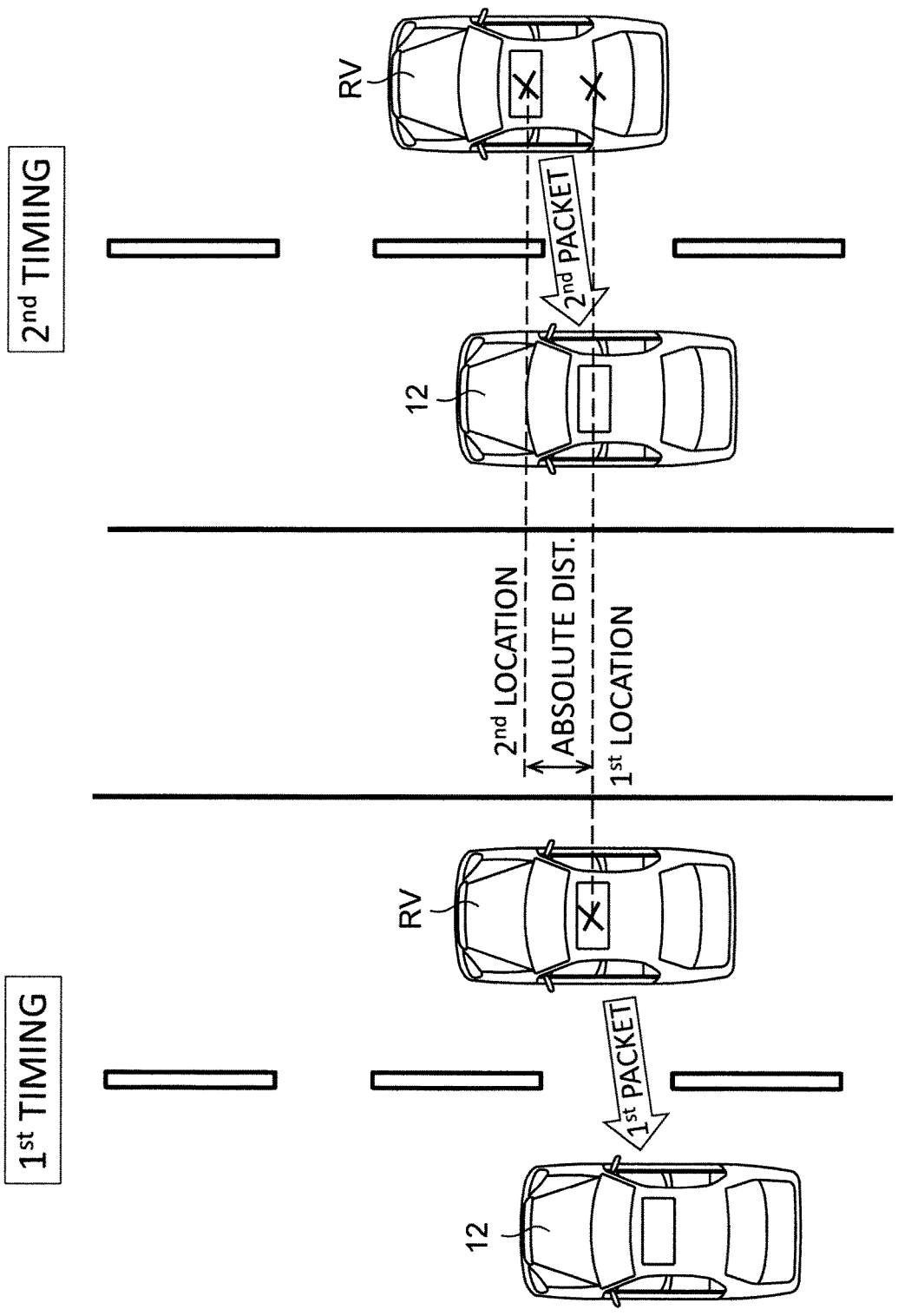
FIG. 5 is a diagram illustrating a non-duplicate temporary ID situation at a first timing and a second timing according to the second embodiment.
Figure 6:
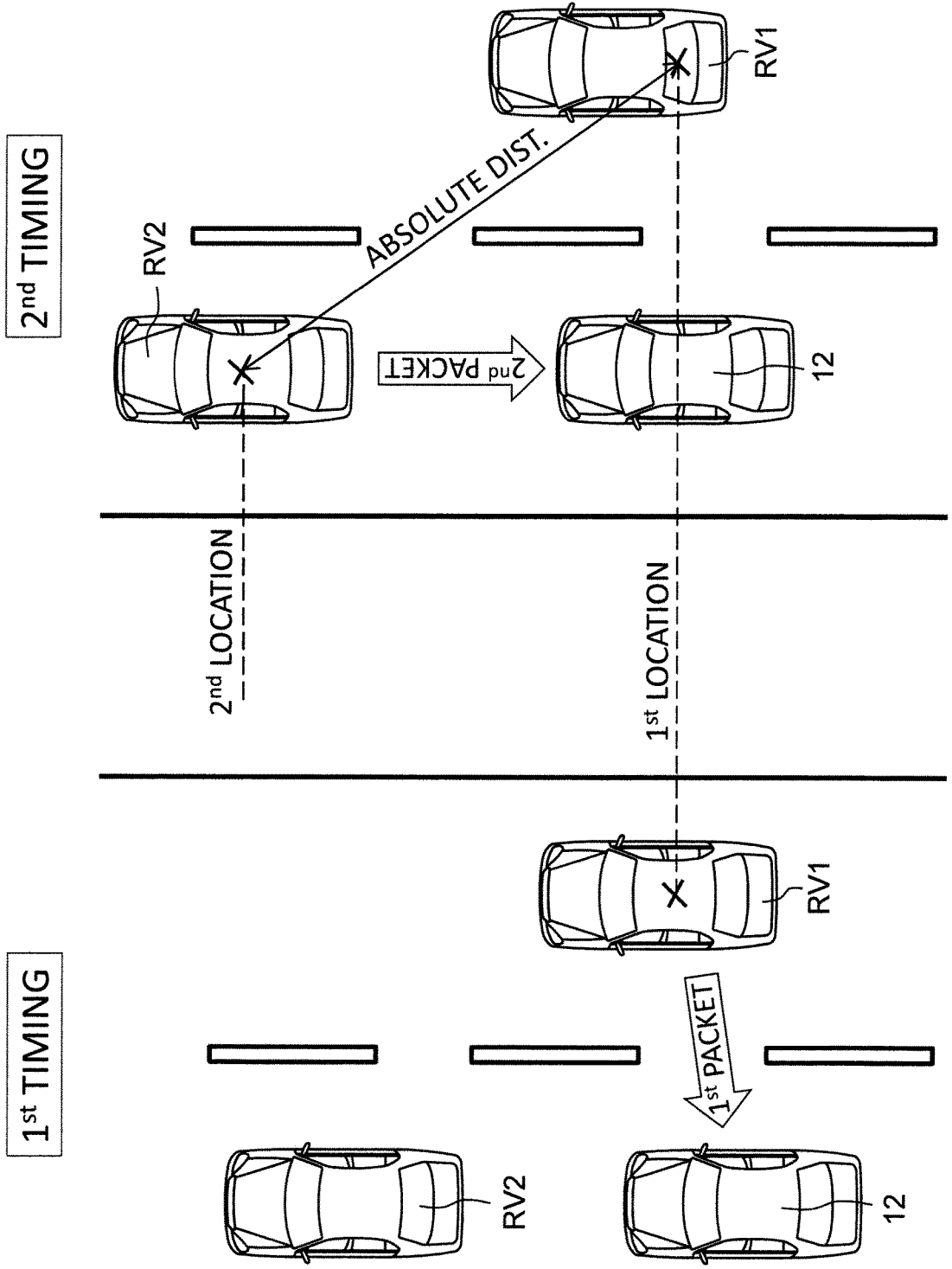
FIG. 6 is a diagram illustrating a duplicate temporary ID situation at a first timing and a second timing according to the second embodiment.
Figure 7:
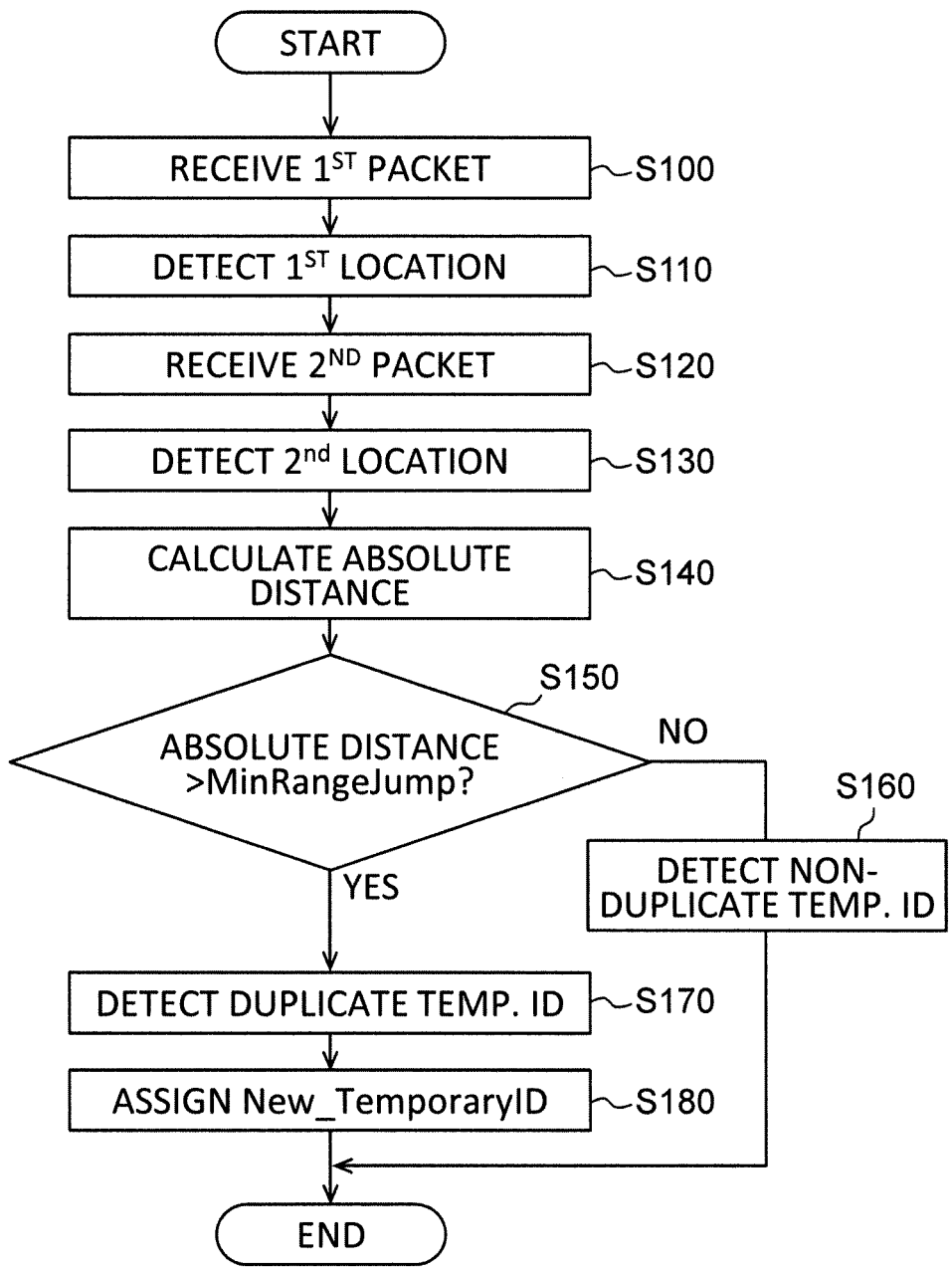
FIG. 7 is a flowchart of operation of the DRSC system according to the second embodiment.

For example, when a duplicate temporary ID situation does not occur as described in FIG. 5, the DSRC system 10 successively receives the first packet and the second packet from one surrounding vehicle RV. Therefore, the first location and the second location are equivalent to positions of the surrounding vehicle RV at the first timing and the second timing, respectively. As a result, the absolute distance between the first location and the second location is equivalent to the traveling distance of the surrounding vehicle RV between the first timing and the second timing. Since the time difference between the first timing and the second timing (i.e., the RV Tx rate) is very small, the value of the absolute distance calculated by the absolute distance calculator 42 is generally small under a non-duplicate temporary ID situation.

In contrast, when a duplicate temporary ID situation occurs, the value of the absolute distance likely increases as compared to the above-described non-duplicate temporary ID situation. As described in FIG. 6, when a duplicate temporary ID situation occurs between a first surrounding vehicle RV1 and a second surrounding vehicle RV2, the DSRC system 10 receives the first packet from the first surrounding vehicle RV1 at the first timing, and then receives the second packet from the second surrounding vehicle RV2 at the second timing. Therefore, the absolute distance between the first location (i.e., the location of the first surrounding vehicle RV1 at the first timing) and the second location (i.e., the location of the second surrounding vehicle RV2 at the second timing) is substantially greater than that calculated in the non-duplicate temporary situation.

In view of the above, the duplication identifier 32 according to the present embodiment is configured to detect occurrence of the duplicate temporary ID situation when the absolute distance calculated by the absolute distance calculator 42 is greater than an absolute distance threshold. In the present embodiment, the absolute distance threshold is defined as MinRangeJump and is set to, e.g., 10 m. Next, operation of the DSRC system 10 (the processing unit 20) according to the present embodiment will be described with reference to FIG. 7.

When the DSRC radio 14 receives a packet (a first packet) of a BSM having a DE_TemporaryID at the first time (Step 100), the packet is stored in the memory 18 in association with the DE_TemporaryID. Then, the locator 40 detects the location (the first location) for the first packet based on the locational information contained in the packet and stores it in the memory 18 at Step 110. Thereafter, the DSRC radio 14 receives a packet (a second packet) having an identical temporary ID value as the first packet at Step 120. Then, the locator 40 detects the location (the second location) for the second packet based on locational information contained in the second packet and stores it in the memory 18 at Step 130.

Next, the absolute distance calculator 42 calculates the absolute distance between the first and second locations stored in the memory 18 at Step 140. At Step 150, the duplication identifier 32 determines whether the absolute distance is greater than the MinRangeJump. When the absolute distance is equal to or less than the MinRangeJump (Step 150: No), the duplication identifier 32 determines that the duplicate temporary ID situation does not occur at Step 160. Then, the process terminates.

On the other hand, when the absolute distance is greater than the MinRangeJump (Step 150: Yes), the duplication identifier 32 determines that the duplicate temporary ID situation occurs at Step 170. Then, the new temporary ID assignor 34 assigns New_TemporaryID as described in the first embodiment (Step 180).

As described above, the DSRC system 10 according to the present embodiment can detect a duplicate temporary ID situation by calculating the absolute distance from the locational information contained in BSMs.

It should be noted that some modifications can be applied to the second embodiment. For example, although the duplication identifier 32 detects the duplicate temporary ID situation based on the absolute distance calculated from two successively received packets. Alternatively, the absolute distance calculator 42 may calculate an average value of absolute distances calculated from a plurality of packets received by the DSRC system 10 during a specified time period (e.g., 1000 ms). By using such an average value of the absolute distances, accuracy of detecting the duplicate temporary ID situation can be further improved.

In the second embodiment, the duplicate identifier detects the duplicate temporary ID situation when the absolute distance is greater than the MinRangeJump. However, the condition for detecting the duplicate temporary ID situation described in this embodiment and the condition for detecting the duplicate temporary situation described in the first embodiment may be combined. That is, when (i) the PER is greater than the PER threshold, (ii) the number of the packets received by the DSRC system 10 is equal to or greater than the MinNumRxPkts, and (iii) the absolute distance is greater than the MinRangeJump, the duplication identifier 32 may detect occurrence of the duplicate temporary ID situation.

Third Embodiment

Next, the third embodiment of the present disclosure will be described below. As described above in the second embodiment, the absolute distance calculator 42 calculates the absolute distance between the locations for two successively received packets. Then, the duplicate identifier detects the duplicate temporary ID situation based on the absolute distance. Alternatively, the DSRC system 10 in the present embodiment detects the duplicate temporary ID situation based on a relative distance for two successively packets relative to the position of the host vehicle 12.

The processing unit 20 includes the locator 40 (described in the second embodiment), a convertor 50, and a relative distance calculator 52 as described in FIG. 8 instead of the PER calculator 30 described in the first embodiment. The locator 40 identifies a location for each packet based on the locational information contained in each of the packets, as described in the second embodiment.

The convertor 50 is configured to convert the location for each packet into an X coordinate location relative to the host vehicle 12 and a Y coordinate location relative to the host vehicle 12. More specifically, the convertor 50 sets an imaginary X-Y coordinate plane perpendicular to a vertical direction (i.e., parallel to the horizontal plane). Then, the convertor 50 obtains the X coordinate location relative to the host vehicle 12 and the Y coordinate location relative to the host vehicle 12 on the imaginary X-Y coordinate plane comparing the location for a packet with the location of the host vehicle 12.

The relative distance calculator 52 is configured to calculate a relative X coordinate distance and a relative Y coordinate distance based on the X coordinate location and the Y coordinate location. The relative X coordinate distance is defined as a distance between the X coordinate locations for two packets successively received by the DSRC system 10 and having an identical temporary ID value. Similarly, the relative Y coordinate distance is defined as a distance between the Y coordinate locations for the successively received two packets and having the identical temporary ID value.

FIG. 9 shows a non-duplicate temporary ID situation where the host vehicle 12 and one surrounding vehicle RV are communicating, assuming the host vehicle 12 and the surrounding vehicle RV are traveling along the Y direction on the imaginary X-Y coordinated plane and are substantially parallel to each other in the X direction. When the DSRC system 10 receives a first packet at a first timing, the locator detects a location of the first packet (i.e., the surrounding vehicle) as the first location. Then, the convertor 50 obtains the X coordinate location (X1) and the Y coordinate location (Y1) for the first packet by comparing the first location with the position of the host vehicle 12 at the first timing. Thereafter, when the DSRC system 10 receives a second packet from the surrounding vehicle RV at a second timing, the locator detects a location for the second packet as a second location. The convertor 50 again obtains the X coordinate location (X2) and the Y coordinate location (Y2) of the surrounding vehicle RV by comparing the second location with the position of the host vehicle 12 at the second timing.

Then, the relative distance calculator 52 calculates the relative X coordinate distance and the relative Y coordinate distance. In this example, the relative Y coordinate distance is equivalent to a travelling distance of the surrounding vehicle RV along the Y direction relative to the host vehicle 12 from the first timing to the second timing. Although the value of the relative Y coordinate distance depends on the relative speed of the surrounding vehicle RV relative to the host vehicle 12, the value normally has a small value as long as the time difference between the first timing and the second timing (i.e., the RV Tx rate) is small. In contrast, the relative X coordinate distance tends to be close in value to 0 as long as the two vehicles are traveling parallel to each other during the time period.

FIG. 10 shows a duplicate temporary ID situation where the host vehicle 12 communicates with a first surrounding vehicle RV1 and a second surrounding vehicle RV2, assuming all the vehicles are traveling in line along the Y direction. In this example, it is assumed that the DSRC system 10 receives a first packet from the first surrounding vehicle RV1 at a first timing and then receives a second packet from the second surrounding vehicle RV2 at a second timing.

When the DSRC system 10 receives the first packet at the first timing, the convertor 50 obtains the X coordinate location and the Y coordinate location of the first surrounding vehicle RV1 (X1, Y1). Thereafter, when the DSRC system 10 receives the second packet from the second surrounding vehicle RV2, the convertor 50 obtains the X coordinate location and the Y coordinate location of the second surrounding vehicle RV2 (X2, Y2). Since the first packet and the second packet have an identical temporary ID value, the relative distance calculator 52 calculates the relative X coordinate distance and the relative Y coordinate distance based on the X coordinate locations and the Y coordinate locations, respectively. In this example, the relative Y coordinate distance is substantially equivalent to the distance between the first surrounding vehicle RV1 at the first timing and the second surrounding vehicle RV2 at the second timing along the Y direction. Therefore, the relative Y coordinate distance calculated has a significant value more than the non-duplicate temporary situation described above. Although the relative X coordinate distance calculated in this example depends on the relative position of the first and second surrounding vehicles RV1, RV2, the value of the relative X coordinate distance is also small as with the non-duplicate temporary ID situation.

FIG. 11 shows another duplicate temporary ID situation involving the host vehicle 12, a first surrounding vehicle RV1, and a second surrounding vehicle RV2 where the three vehicles are traveling in the Y direction and are substantially parallel to each other in the X direction. As with the situation shown in FIG. 10, the DSRC system 10 receives a first packet from the first surrounding vehicle RV1 and then receives a second packet from the second surrounding vehicle RV2. In this example, the relative X coordinate distance calculated is substantially equivalent to the distance between the first surrounding vehicle RV1 at the first timing and the second surrounding vehicle RV2 at the second timing along the X direction. Thus, the value of the relative X coordinate distance has a substantially larger value as compared to the non-duplicate temporary situation shown in FIG. 9. In contrast, the relative Y coordinate distance calculated in this example is generally small, although the value depends on the relative speed between the first surrounding vehicle RV1 and the second surrounding vehicle RV2.

As described above, at least one of the relative X coordinate distance and the relative Y coordinate distance likely has a large value under the duplicate temporary ID situation. In view of this, the duplication identifier 32 in the present embodiment is configured to detect occurrence of the duplicate temporary ID situation when at least one of the relative X coordinate distance and the relative Y coordinate distance is greater than a relative distance threshold. In the present embodiment, the relative distance threshold is defined as MinXYJump and is set to 10 m, for example.

Next, operation of the DSRC system 10 (the processing unit 20) according to the present embodiment will be described with reference to FIG. 12.

When the DSRC radio 14 receives a packet (a first packet) of a BSM having a DE_TemporaryID for the first time (Step 200), the packet is stored in the memory 18 in association with the DE_TemporaryID. Then, the locator 40 detects a location (i.e., a first location) for the first packet based on the locational information contained in the first packet at Step 210. Thereafter, the convertor 50 converts the location into the X coordinate location and the Y coordinate location on the imaginary X-Y coordinate plane and stores these locations in association with the DE_temporaryID at Step 220. When the DSRC radio 14 successively receives a packet (a second packet) having an identical temporary ID value as the first packet at Step 230, the locator 40 detects a location (i.e., a second location) for the second packet at Step 240. Then, the convertor 50 converts the location into the X coordinate location and the Y coordinate location and stores these locations in association with the DE_TemporaryID at Step 250.

When two packets having the identical temporary ID value are successively received, the relative distance calculator 52 calculates the relative X coordinate distance and the relative Y coordinate distance based on the X coordinate locations and the Y coordinate locations stored in the memory 18, respectively, at Step 260. If both the X and Y coordinate distances are equal to or less than the MinXYJump (Step S 270: No), the duplication identifier 32 determines that a duplicate temporary ID situation does not occur at Step 280, and then the process terminates.

On the other hand, when at least one of the relative X and Y coordinate distances is greater than the MinXYJump (Step 270: Yes), the duplication identifier 32 determines that a duplicate temporary ID situation occurs at Step 290. Then, the new temporary ID assignor 34 assigns New_TemporaryID as described in the first embodiment (Step 295).

As described above, the DSRC system 10 according to the present embodiment can detect a duplicate temporary ID situation by calculating the relative X and Y coordinate distances from the locational information contained in BSMs. Furthermore, the DSRC system 10 in the present embodiment determines the duplicate temporary ID situation even when either the relative X or Y coordinate distance is greater than the MinXYJump. Therefore, regardless of situations where the host vehicle 12 and surrounding vehicles RV are traveling in line or traveling in parallel, the DSRC system 10 can properly detect the duplicate temporary ID situation.

It should be noted that some modifications can be applied to the third embodiment. For example, although the duplication identifier 32 detects the duplicate temporary ID situation based on the relative X and Y distances calculated from two successively received packets, the relative distance calculator 52 may calculate an average value of relative X coordinate distances from a plurality of packets and an average value of relative Y coordinate distances from the plurality of packets during a specified time period (e.g., 1000 ms). By using the average values of the relative X and Y coordinate distances, accuracy of detecting the duplicate temporary ID situation can be further improved.

In the third embodiment, the duplicate identifier detects the duplicate temporary ID situation when at least one of the relative X and Y distances is greater than the MinXYJump. However, the condition for detecting the duplicate temporary ID situation described in this embodiment and the condition for detecting the duplicate temporary situation described in the first embodiment and/or the second embodiment may be combined. For example, when (i) the PER is greater than a PER threshold, (ii) the number of the packets received by the DSRC system 10 is equal to or greater than the MinNumRxPkts, and (iii) at least one of the relative X and Y distances is greater than the MinXYJump, the duplication identifier 32 may detect occurrence of the duplicate temporary ID situation. Alternatively, when (i) the absolute distance is greater than the MinRangeJump and (ii) at least one of the relative X and Y distances is greater than the MinXYJump, the duplication identifier 32 may detect occurrence of the duplicate temporary ID situation.

Fourth Embodiment

Next, the DSRC system 10 according to the fourth embodiment will be described with reference to FIGS. 13 to 15. In the fourth embodiment, the processing unit 20 includes the locator 40 (described in the second and third embodiments), a location estimator 60 and a deviation calculator 62 instead of the PER calculator 30 described in the first embodiment as shown in the block diagram of FIG. 13. The locator 40 identifies a location for each packet based on the locational information (i.e., a latitude and a longitude) contained in each of the packets, as described in the second and third embodiments.

The location estimator 60 is configured to estimate a projected location for a packet (a second packet) that is received by the DSRC system 10 subsequent to a packet (a first packet) that was received by the DSRC system 10, assuming the first packet and the second packet have an identical temporary ID value. That is, the projected location is an estimated location where a certain packet, which is received by the DSRC system 10, is expected to be transmitted based on information contained in a packet previously obtained. The location estimator 60 estimates the projected location for the second packet based on the location for the first packet, information contained in the first packet, and the time difference between the first packet and the second packet. The information includes speed information and heading information as described in the first embodiment. In this embodiment, "the time difference between the first packet and the second packet" is defined as a time difference between the position determination times. As described in the first embodiment, the positional information includes the position determination time, and therefore, each of the first packet and the second packet contains a unique position determination time. Hence, in this embodiment, the location estimator 60 estimates the projected location using the time difference between the position determination time contained in the first packet and the position determination time contained in the second packet. Alternatively, "the time difference between the first packet and the second packet" may be defined as a time difference between the timing of receiving the first packet and the timing of receiving the second packet. That is, the location estimator 60 may estimate the projected location using the time difference between the timing when the DSRC system 10 of the host vehicle 12 receives the first packet and the timing when the DSRC system 10 receives the second packet.

The deviation calculator 62 is configured to calculate a deviation between the location for the second packet detected by the locator 40 and the projected location estimated by the location estimator 60. That is, the deviation calculator 62 compares the projected location for the second packet with the location for the second packet actually detected by the locator 40.

For example, in a non-duplicate temporary ID situation, it is assumed that the DSRC system 10 receives a first packet at a first timing from one surrounding vehicle RV and then receives a second packet at a second timing from the surrounding vehicle RV. In this situation, when the DSRC system 10 receives the first packet, the locator 40 detects the location as a first location for the first packet (i.e., the location of the surrounding vehicle RV at the first timing) based on the locational information contained in the first packet.

When the DSRC system 10 receives the second packet from the surrounding vehicle RV at the second timing, the location estimator 60 estimates the projected location for the second packet based on the first location, the speed information, the heading information that are contained in the first packet, and the time difference between the position determination time contained in the first packet and the position determination time contained in the second packet. In this example, this projected location is equivalent to an estimated position where the surrounding vehicle RV is expected to be positioned at the second timing.

Then, the locator 40 detects the location as a second location for the second packet based on the locational information. The second location is an actual position of the surrounding vehicle RV at the second timing. Then, the deviation calculator 62 calculates the deviation between the projected location and the second location. In this example, since the projected location should have a value close to the actual location (i.e., the second location) of the surrounding vehicle RV at the second timing, the deviation calculated likely has a small value. In this way, when a duplicate temporary ID situation does not occur, the deviation tends to be a small value.

In contrast, FIG. 14 shows a duplicate temporary ID situation where an identical temporary ID value is coincidently assigned between a first surrounding vehicle RV1 and a second surrounding vehicle RV2. In this example, it is assumed that the DSRC system 10 receives a first packet from the first surrounding vehicle RV1 at a first timing and then receives a second packet from the second surrounding vehicle RV2 at a second timing.

When the DSRC system 10 receives the first packet at the first timing, the locator 40 detects the first location (i.e., the location of the first surrounding vehicle RV1 at the first timing). Then, when the DSRC system 10 receives the second packet from the second surrounding vehicle RV2 at the second timing, the location estimator 60 estimates the projected location for the second packet at the first timing based on the first location, the speed information, the heading information, both of which are contained in the first packet, and the time difference between the position determination time contained in the first packet and the position determination time contained in the second packet. In this example, since the location estimator 60 estimates the projected location based on the information regarding the first surrounding vehicle RV1, the projected location is equivalent to an estimated position where the first surrounding vehicle RV1 is expected to be at the second timing.

Next, the locator 40 detects the second location. In this case, the second location is an actual position of the second surrounding vehicle RV2 at the second timing. Then, the deviation calculator 62 calculates the deviation between the second location and the projected location. In this example, since the deviation calculator 62 compares the second location for "the second surrounding vehicle RV2" at the second timing with the projected location for "the first surrounding vehicle RV1" at the second timing. Since the projected location of the first surrounding vehicle RV1 is significantly different from the actual location of the second surrounding vehicle RV2, the deviation calculated likely has a large value (see FIG. 14 at the second timing).

In this way, the deviation between the second location and the projected location tends to have a large value when the duplicate temporary ID situation occurs.

In view of this, the duplication identifier 32 in the present embodiment is configured to detect occurrence of the duplicate temporary ID situation when the deviation calculated by the deviation calculator 62 is greater than a deviation threshold. In the present embodiment, the deviation threshold is defined as MaxTolerance and set to 20 m, for example.

Next, operation of the DSRC system 10 (the processing unit 20) according to the present embodiment will be described with reference to FIG. 15.

When the DSRC radio 14 receives a packet (a first packet) having a DE_TemporaryID for the first time (Step 300), the first packet is stored in the memory 18 in association with the DE_TemporaryID. Then, the locator 40 detects the first location for the first packet based on the locational information contained in the first packet and stores it in the memory in association with the DE_TemporaryID at Step 310. At the same time, the speed information, the heading information, and the position determination time contained in the first packet are stored in the memory 18 in association with the DE_TemporaryID.

When the DSRC system 10 receives a packet (i.e., a second packet) having an identical temporary ID value as the first packet at Step 320, the location estimator 60 estimates, at Step 330, the projected location for the second packet based on the first location, the speed information, the heading information obtained at Step 310, and the time difference between the position determination time contained in the first packet and the position determination time contained in the second packet. Then, the locator 40 detects the second location for the second packet at Step 340. Next, the deviation calculator 62 calculates, at Step 350, the deviation between the second location obtained at Step 340 and the projected location obtained at Step 320.

If the deviation calculated at Step 350 is equal to or less than the MaxTolerance (Step 360: No), the duplication identifier 32 determines that a duplicate temporary ID situation does not occur at Step 370, and then the process terminates.

On the other hand, when the deviation is greater than the MaxTolerance (Step 360: Yes), the duplication identifier 32 determines that a duplicate temporary ID situation occurs at Step 380. Then, the new temporary ID assignor 34 assigns New_TemporaryID to BSMs transmitted from one of two surrounding vehicles RV as described in the first embodiment (Step 390).

As described above, the DSRC system 10 according to the present embodiment can detect a duplicate temporary ID situation by calculating the deviation based on the information contained in BSMs.

It should be noted that some modifications can be applied to the fourth embodiment. For example, although the duplication identifier 32 detects a duplicate temporary ID situation based on the deviation calculated from two successively received packets (i.e., the first and second packets). Alternatively, the deviation calculator 62 may calculate an average value of deviations based on a plurality of packets during a specified time period (DevDetectionTime (e.g., 1000 ms)). By using the average value of the deviation, accuracy of detecting the duplicate temporary ID situation can be improved.

In the fourth embodiment, the deviation is defined as an actual distance between the location and the projected location for the second packet. Alternatively, a distance in the latitudinal direction (a latitudinal deviation) between the location and the projected location and a distance in the longitudinal direction (a longitudinal deviation) between the location and the projected location can be calculated. Then, if the latitudinal deviation is equal to or greater than a MaxLatitudinalTolerance (e.g., 20 m) or the longitudinal deviation is equal to or greater than a MaxLongitudinalTolerance (e.g., 20 m), the duplication identifier 32 may detect a duplicate temporary ID situation.

In the fourth embodiment, the duplicate identifier detects the duplicate temporary ID situation when the deviation is greater than the MaxTolerance. However, the condition for detecting a duplicate temporary ID situation described in this embodiment and the condition for detecting the duplicate temporary situation described in at least one of the first to third embodiments may be combined. For example, when (i) the PER is greater than a PER threshold, (ii) the number of the packets received by the DSRC system 10 is equal to or greater than the MinNumRxPkts, and (iii) the deviation is greater than the MaxTolerance, the duplication identifier 32 may detect occurrence of the duplicate temporary ID situation. Alternatively, when (i) at least one of the relative X and Y distances is greater than the MinXYJump and (ii) the deviation is greater than the MaxTolerance, the duplication identifier 32 may detect occurrence of the duplicate temporary ID situation. As yet another alternative, when (i) the absolute distance is greater than the MinRangeJump and (ii) the deviation is greater than the MaxTolerance, the duplication identifier 32 may detect occurrence of the duplicate temporary ID situation.

Other Embodiments

In addition to the above described methods for detecting the duplicate temporary ID situation, the following methods can be used solely or in combination with the methods described in the first to fourth embodiments.

1) Detection Based on a Packet Reception Rate

As described in the first embodiment, the DSRC system 10 transmits packets of BSMs at a HV Tx rate, and surrounding vehicles RV transmits packets of BSMs at RV Tx rates. When the host vehicle 12 and a surrounding vehicle RV are positioned close to each other so that these vehicles are substantially in the same wireless channel situation, the HV Tx rate for the host vehicle 12 and the RV Tx rate for the surrounding vehicle RV generally have a similar value. Therefore, in a non-duplicate temporary ID situation, the DSRC system 10 would receive packets of BSMs from a surrounding vehicle RV at a rate similar to the HV Tx rate.

However, if a duplicate temporary ID situation occurs among two or more surrounding vehicles RV, the DSRC system 10 of the host vehicle 12 receives packets at a rate substantially greater than the HV Tx rate because the DSRC system 10 would receive packets of BSMs having an identical temporary ID value from the two or more surrounding vehicles RV.

In view of the above, the duplication identifier 32 may be configured to detect the duplicate temporary ID situation when the DSRC (the receiver 26) receives packets of BSMs having an identical temporary ID value at a rate greater than the HV Tx rate. For example, in a case where a duplication temporary ID situation occurs between two surrounding vehicles RV, when the DSRC system 10 receives packets at a rate greater than the HV Tx rate, the duplication identifier 32 determines occurrence of the duplication temporary ID situation. Once the duplication temporary ID situation is identified by the duplication identifier 32, the new temporary ID assignor 34 assigns a new temporary ID value for BSMs transmitted from one of the surrounding vehicles RV, as with the first embodiment.

2) Detection Based on Security Certificate Digests

Each of the DSRC 10 systems for the host vehicle 12 and surrounding vehicles RV has a unique security certificate, and the certificate is contained in some BSMs. Even if BSMs do not have a full certificate, the BSMs contain a security certificate digest. Each security certificate digest has an 8 byte value that is also unique to each DSRC system 10. Therefore, when the DSRC system 10 receives the BSMs having an identical temporary ID value but different security certificate digests, the BSMs are likely transmitted from different surrounding vehicles RV.

In view of the above, the duplication identifier 32 may be configured to detect the duplicate temporary ID situation when the BSMs received by the receiver 26 have an identical temporary ID value but different security certificate digests.

For example, when the DSRC system 10 receives BSMs with a DE_TemporaryID, the security certificate digest contained in the BSM is stored in the memory 18 in association with the DE_TemporaryID. Then, if the DSRC system receives BSMs with an identical temporary ID value as the previously received BSMs, the duplication identifier 32 compares the security certificate digest contained in the BSMs currently received with the security certificate digest stored in the memory 18. Then, if the two security certificate digests are not identical, the duplication identifier 32 detects occurrence of a duplicate temporary ID situation. Once the DSRC system 10 identifies the duplication temporary ID situation, the new temporary ID assignor 34 assigns a new temporary ID value for BSMs transmitted from one of the surrounding vehicles RV, as with the first embodiment.

It should be understood that when the security certificate digest cannot be obtained from BSMs, the DSRC system 10 may calculate the security certificate digest from the security certificate itself.

3) Detection Based on MAC Addresses

Each of the DSRC systems for the host vehicle 12 and surrounding vehicles RV has a media access control (MAC) address. The MAC address has a 6 byte value and is randomly set by each DSRC system 10, and therefore each DSRC system 10 usually has an unique MAC address. Therefore, when BSMs have an identical temporary ID value but different MAC addresses, the BSMs are likely transmitted from different surrounding vehicles RV.

In view of the above, the duplication identifier 32 may be configured to detect a duplicate temporary ID situation when the BSMs received by the DSRC system 10 (the receiver 26) have an identical temporary ID value but different MAC addresses.

For example, when the DSRC system 10 receives BSMs with a DE_TemporaryID, a MAC address contained in the BSM is stored in the memory 18 in association with the DE_TemporaryID. Then, if the DSRC system receives BSMs with an identical temporary ID value, the duplication identifier 32 compares the MAC address contained in the BSMs currently received with the MAC address stored in the memory 18. Then, if the two MAC addresses are not identical, the duplication identifier 32 detects occurrence of a duplicate temporary ID situation. Once the DSRC system 10 identifies the duplication temporary ID situation, the new temporary ID assignor 34 assigns a new temporary ID value for BSMs transmitted from one of the surrounding vehicles RV, as with the first embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed. As used herein, the term "and/or" includes any and all combinations of one or more of the associated listed items.

What is claimed is:

1. An apparatus mounted on a host vehicle to detect a duplicate temporary ID in basic safety messages (BSMs), the apparatus comprising:
 a receiver configured to receive the BSMs from surrounding vehicles through packet transmission;
 a duplication identifier configured to identify the duplicate temporary ID based on the BSMs having an identical temporary ID value commonly used by at least two surrounding vehicles;
 a locator configured to detect a location for each of the packets from which each of the packets is transmitted based on locational information contained in the each of the packets;
 an absolute distance calculator configured to calculate an absolute distance between the locations for two successive packets having the identical temporary ID value; and
 a packet error rate (PER) calculator configured to calculate a PER during a specified time for the BSMs having the identical temporary ID value, wherein
 the duplication identifier is configured to identify the duplicate temporary ID when the absolute distance calculated by the absolute distance calculator is greater than an absolute distance threshold, and
 the duplication identifier configured to identify the duplicate temporary ID when the PER calculated by the PER calculator is greater than a PER threshold and the absolute distance calculated by the absolute distance calculator is greater than the absolute distance threshold.

2. The apparatus according to claim 1, further comprising a new temporary ID assignor configured to assign a new temporary ID having a value different from the identical temporary ID value to the BSMs transmitted from one of the two surrounding vehicles when the duplication identifier identifies the duplicate temporary ID.

3. An apparatus mounted on a host vehicle to detect a duplicate temporary ID in basic safety messages (BSMs), the apparatus comprising:
a receiver configured to receive the BSMs from surrounding vehicles through packet transmission;
a duplication identifier configured to identify the duplicate temporary ID based on the BSMs having an identical temporary ID value commonly used by at least two surrounding vehicles;
a locator configured to detect a location for each of the packets from which each of the packets is transmitted based on locational information contained in each of the packets;
a convertor configured to convert the location for each of the packets into an X coordinate location relative to the host vehicle and a Y coordinate location relative to the host vehicle;
a relative distance calculator configured to calculate a relative X coordinate distance between the X coordinate locations for two successive packets having the identical temporary ID value and a relative Y coordinate distance between the Y coordinate locations for the two successive packets; and
a packet error rate (PER) calculator configured to calculate a PER during a specified time for the BSMs having the identical temporary ID value, wherein
the duplication identifier is configured to identify the duplicate temporary ID when at least one of the relative X coordinate distance and the relative Y coordinate distance is greater than a relative distance threshold, and
the duplication identifier configured to identify the duplicate temporary ID when the PER calculated by the PER calculator is greater than a PER threshold and the at least one of the relative X coordinate distance and the relative Y coordinate distance is greater than the relative distance threshold.

4. The apparatus according to claim 3, further comprising a new temporary ID assignor configured to assign a new temporary ID having a value different from the identical temporary ID value to the BSMs transmitted from one of the two surrounding vehicles when the duplication identifier identifies the duplicate temporary ID.

5. An apparatus mounted on a host vehicle to detect a duplicate temporary ID in basic safety messages (BSMs), the apparatus comprising:
a receiver configured to receive the BSMs from surrounding vehicles through packet transmission;
a duplication identifier configured to identify the duplicate temporary ID based on the BSMs having an identical temporary ID value commonly used by at least two surrounding vehicles;
a locator configured to detect a location for each of the packets, including a first packet and a second packet, from which each of the packets is transmitted based on locational information contained in each of the packets, the first packet and the second packet being successively received by the receiver in this order;
a location estimator configured to estimate a projected location for the second packet based on the location for the first packet detected by the locator, speed information contained in the first packet, heading information contained in the first packet, and a time difference between the first packet and the second packet;
a deviation calculator configured to calculate a deviation between the location for the second packet detected by the locator and the projected location estimated by the location estimator; and
a packet error rate (PER) calculator configured to calculate a PER during a specified time for the BSMs having the identical temporary ID value, wherein
the duplication identifier is configured to identify the duplicate temporary ID when the deviation calculated by the deviation calculator is greater than a deviation threshold, and
the duplication identifier configured to identify the duplicate temporary ID when the PER calculated by the PER calculator is greater than a PER threshold and the deviation calculated by the deviation calculator is greater than the deviation threshold.

6. The apparatus according to claim 5, further comprising a new temporary ID assignor configured to assign a new temporary ID having a value different from the identical temporary ID value to the BSMs transmitted from one of the two surrounding vehicles when the duplication identifier identifies the duplicate temporary ID.

* * * * *